US010692375B1

(12) United States Patent
Dagley et al.

(10) Patent No.: US 10,692,375 B1
(45) Date of Patent: Jun. 23, 2020

(54) LOTLESS STORAGE OF VEHICLE INVENTORY

(71) Applicant: Capital One Services, LLC, McLean, VA (US)

(72) Inventors: Geoffrey Dagley, McKinney, TX (US); Jason Hoover, Grapevine, TX (US); Micah Price, Anna, TX (US); Stephen Wylie, Carrollton, TX (US); Qiaochu Tang, The Colony, TX (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 16/689,465

(22) Filed: Nov. 20, 2019

Related U.S. Application Data

(62) Division of application No. 16/267,596, filed on Feb. 5, 2019, now Pat. No. 10,504,366.

(51) Int. Cl.
| | |
|---|---|
| *G08G 1/14* | (2006.01) |
| *G06Q 10/02* | (2012.01) |
| *G05D 1/00* | (2006.01) |
| *H04W 4/44* | (2018.01) |
| *H04W 4/029* | (2018.01) |
| *G06Q 30/06* | (2012.01) |

(52) U.S. Cl.
CPC .......... *G08G 1/146* (2013.01); *G05D 1/0088* (2013.01); *G06Q 10/02* (2013.01); *G06Q 30/0645* (2013.01); *G08G 1/144* (2013.01); *G08G 1/148* (2013.01); *H04W 4/029* (2018.02); *H04W 4/44* (2018.02)

(58) Field of Classification Search
None
See application file for complete search history.

(56) References Cited

U.S. PATENT DOCUMENTS 7,312,722 B2    12/2007  Tillotson et al.
9,704,401 B2*   7/2017   Akavaram ............. G08G 1/146
(Continued)

FOREIGN PATENT DOCUMENTS

WO    2013086140 A1    6/2013

OTHER PUBLICATIONS

AirPandP., "Features & Benefits," Nov. 17, 2017, 3 pages. Retrieved from Internet:[URL:https://www.airpandp.com/feautres-benefits/].
(Continued)

*Primary Examiner* — Daniell L Negron
(74) *Attorney, Agent, or Firm* — Harrity & Harrity, LLP

(57) ABSTRACT

A server device may receive a first request to utilize surplus parking spaces available at one or more locations from a first device associated with an organization having an inventory of vehicles to be stored in the surplus parking spaces. The server device may process, between the organization and one or more parking providers associated with the one or more locations, a transaction allocating the surplus parking spaces to the organization. The server device may receive, from a second device, a second request to use a vehicle in the inventory from a starting location. The server device may determine, from among the surplus parking spaces allocated to the organization, a storage location for the vehicle that differs from the starting location and transmit, to the second device, a notification indicating that the vehicle is ready for use based on the vehicle having been moved to the starting location.

20 Claims, 11 Drawing Sheets

(56) References Cited

U.S. PATENT DOCUMENTS

| | | | | |
|---|---|---|---|---|
| 10,166,978 B2* | 1/2019 | Lorenz | | B60R 16/037 |
| 10,482,766 B2* | 11/2019 | Mowatt | | G06Q 30/0284 |
| 2009/0125341 A1 | 5/2009 | Somoza et al. | | |
| 2009/0171737 A1* | 7/2009 | Polanco | | G06Q 30/00 |
| | | | | 705/26.41 |
| 2017/0061508 A1* | 3/2017 | Sen | | G06Q 30/0284 |
| 2017/0169398 A1 | 6/2017 | Washington et al. | | |

OTHER PUBLICATIONS

CBS Chicago., "New App Allows Owners To Rent Out Unused Parking Spaces," Dec. 12, 2016, 1 page. Retrieved from Internet:[URL:https://chicago.cbslocal.com/2016/12/12/new-app-allows-owners-to-rent-out-unused-parking-spaces/].

Co-pending U.S. Appl. No. 16/267,596, filed Feb. 5, 2019.

Parklee LLC., "Parklee for iPhone," Oct. 26, 2015, 2 pages. Retrieved from Internet:[URL:https://download.cnet.com/Parklee/3000-20428_4-76600178.html].

Plumer B., "Cars Take Up Way Too Much Space in Cities. New Technology Could Change That.," Vox.com, Sep. 26, 2016, 8 pages. Retrieved from Internet:[URL:https://www.vox.com/a/new-economy-future/cars-cities-technologies].

Yglesias M., "The End of Parking Misery," Slate.com, Dec. 26, 2012, 2 pages. Retrieved from Internet:[URL: https://slate.com/business/2012/12/parking-panda-rent-your-unused-parking-space.html].

* cited by examiner

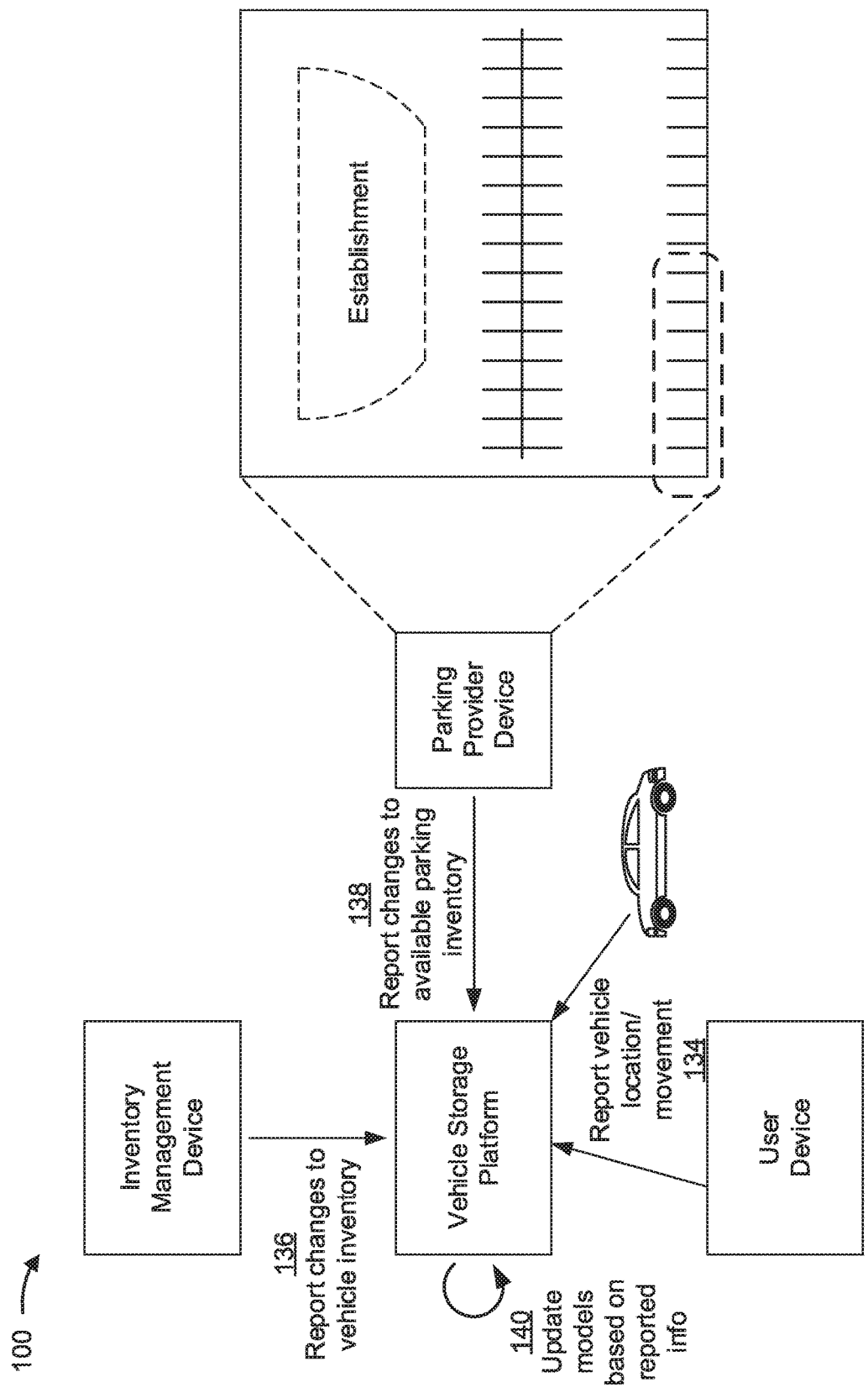

LOTLESS STORAGE OF VEHICLE INVENTORY

RELATED APPLICATION

This application is a divisional of U.S. patent application Ser. No. 16/267,596, filed Feb. 5, 2019, which is incorporated herein by reference.

BACKGROUND

There are various types of organizations that may have an inventory of vehicles. For example, vehicle dealers, taxicab companies, public utilities, bus companies, postal services, delivery services, police departments, car rental agencies, and/or other organizations may own or lease a group of vehicles that generally need to be stored while not in use. Conventionally, these vehicles are stored in a dedicated facility (e.g., a parking lot or garage) located on real estate owned or rented by the organization(s) who are storing their vehicles at the dedicated facility.

SUMMARY

According to some implementations, a method may include receiving, at one or more server devices, information related to surplus parking spaces that are available at a plurality of locations. The method may include receiving, at the one or more server devices, a first request to utilize a quantity of the surplus parking spaces that are available at one or more of the plurality of locations, wherein the first request is received from a first device associated with a vehicle dealer having an inventory of vehicles to be stored in the surplus parking spaces that are available at the one or more of the plurality of locations. The method may include processing, at the one or more server devices, a transaction between the vehicle dealer and one or more parking providers associated with the one or more of the plurality of locations, wherein the transaction allocates the quantity of the surplus parking spaces available at the one or more of the plurality of locations to the vehicle dealer. The method may include receiving, at the one or more server devices, a second request to test drive a vehicle in the inventory of vehicles associated with the vehicle dealer, wherein the second request is received from a second device associated with a customer and identifies a starting location for the test drive. The method may include determining, at the one or more server devices, a storage location for the vehicle from among the quantity of the surplus parking spaces allocated to the vehicle dealer, wherein the storage location for the vehicle differs from the starting location for the test drive. The method may include orchestrating, by the one or more server devices, delivery of the vehicle from the storage location to the starting location for the test drive; and transmitting, by the one or more server devices, information to the second device indicating an approximate time when the vehicle will arrive at the starting location for the test drive.

According to some implementations, a server device may include one or more memories, and one or more processors, communicatively coupled to the one or more memories, to receive information related to surplus parking spaces that are available at a plurality of locations. The one or more processors may receive a first request to utilize a quantity of the surplus parking spaces that are available at the plurality of locations, wherein the first request is received from a device associated with a vehicle dealer having an inventory of vehicles to be stored in the surplus parking spaces. The one or more processors may allocate the quantity of the surplus parking spaces to the vehicle dealer from among the surplus parking spaces available at the plurality of locations, wherein the quantity of the surplus parking spaces allocated to the vehicle dealer includes a first set of surplus parking spaces available at a first one of the plurality of locations and a second set of surplus parking spaces available at a second one of the plurality of locations. The one or more processors may receive, from the device associated with the vehicle dealer, a second request for a recommended storage location for a vehicle in the inventory of vehicles, wherein the second request includes profile information associated with a likely user of the vehicle. The one or more processors may transmit, to the device associated with the vehicle dealer, information indicating the recommended storage location for the vehicle, wherein the recommended storage location is selected from among the first one of the plurality of locations and the second one of the plurality of locations based on a comparison of the profile information associated with the likely user of the vehicle and profile information associated with clientele at establishments in proximity to the first set of surplus parking spaces and the second set of surplus parking spaces allocated to the vehicle dealer.

According to some implementations, a non-transitory computer-readable medium may store instructions that include one or more instructions that, when executed by one or more processors of a server device, cause the one or more processors to receive information related to surplus parking spaces that are available at a plurality of locations. The one or more instructions may cause the one or more processors to receive a first request to utilize a quantity of the surplus parking spaces that are available at one or more of the plurality of locations, wherein the first request is received from a first device associated with an organization having an inventory of vehicles to be stored in the surplus parking spaces that are available at the one or more of the plurality of locations. The one or more instructions may cause the one or more processors to process a transaction between the organization and one or more parking providers associated with the one or more of the plurality of locations, wherein the transaction allocates the quantity of the surplus parking spaces available at the one or more of the plurality of locations to the organization. The one or more instructions may cause the one or more processors to receive a second request to use a vehicle in the inventory of vehicles associated with the organization, wherein the second request is received from a second device associated with a user and identifies a starting location for the use of the vehicle. The one or more instructions may cause the one or more processors to determine a storage location for the vehicle from among the quantity of the surplus parking spaces allocated to the organization, wherein the storage location for the vehicle differs from the starting location for the use of the vehicle. The one or more instructions may cause the one or more processors to transmit, to the second device, a notification indicating that the vehicle is ready for use based on determining that the vehicle has been moved to the starting location for the use of the vehicle.

BRIEF DESCRIPTION OF THE DRAWINGS

FIGS. 1A-1F are diagrams of one or more example implementations described herein.

DETAILED DESCRIPTION

Figure 1A:
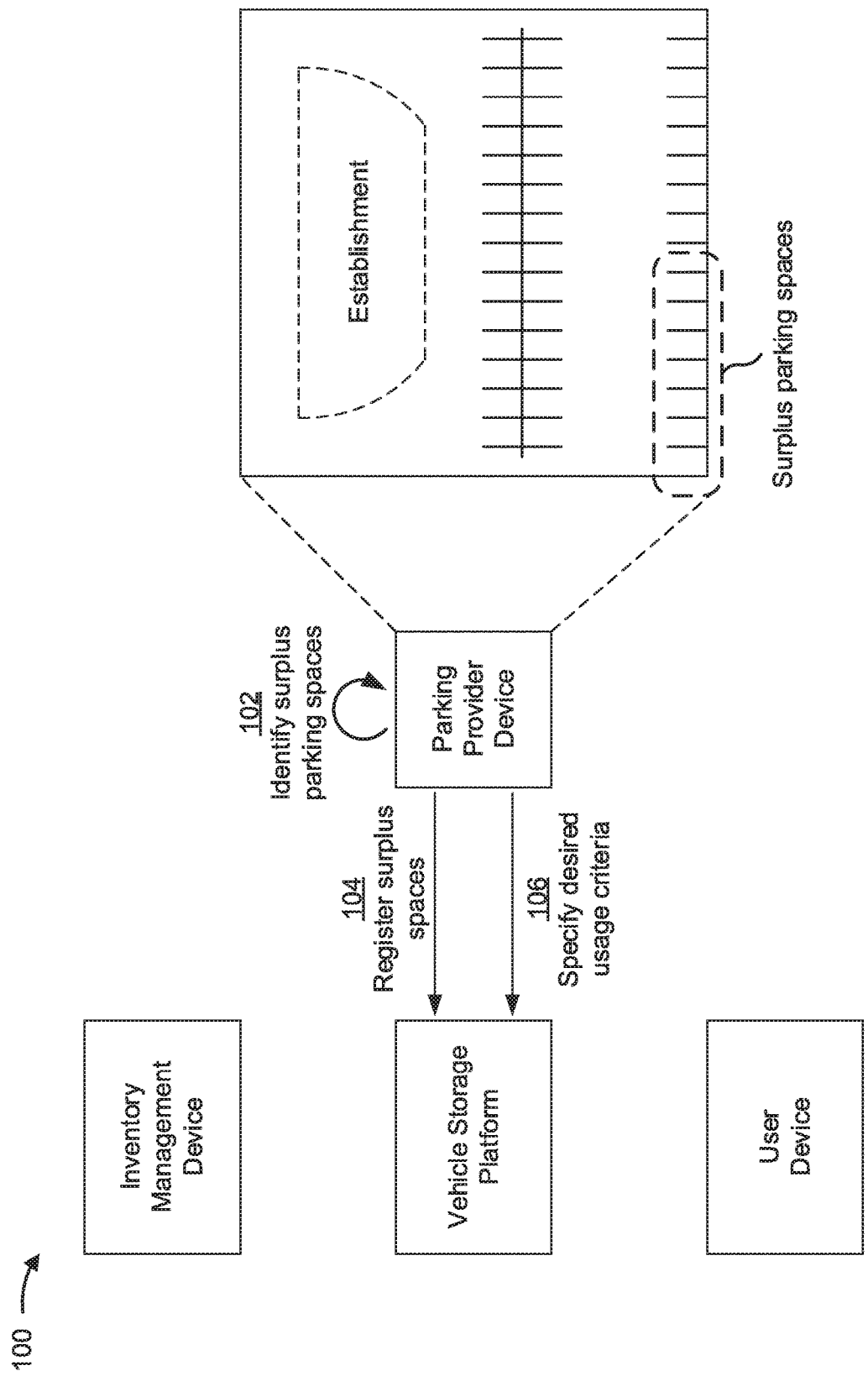

The following detailed description of example implementations refers to the accompanying drawings. The same reference numbers in different drawings may identify the same or similar elements.

Managing storage for an inventory of vehicles (sometimes called a vehicle fleet and/or the like) is often a complex problem with various facets. For example, organizations that have an inventory of vehicles to be stored (e.g., vehicle dealerships, taxicab companies, public utilities, and/or the like) conventionally purchase or rent real estate that houses a dedicated facility, such as a parking lot or parking garage, where the vehicles can be stored. This can lead to inefficient and wasteful use of land resources, as stored (i.e., parked) vehicles may sit empty and unused for significant amounts of time. Furthermore, suitable sites to house a dedicated facility to store an inventory of vehicles may be scarce or non-existent in urban or metropolitan areas, inconveniently located in rural or suburban areas, expensive regardless of location, and so on. As such, using dedicated facilities to store vehicle inventories may lead to inefficient usage of scarce land resources and other resources. For example, in addition to the acreage needed to house the dedicated facility, managing centralized vehicle lots tends to introduce further costs and wasted technological resources related to providing site security (e.g., fencing, lighting, and/or the like), providing interior and/or exterior cleaning facilities, providing inspection facilities, providing employee parking, and deploying sensors, communication devices, and/or other information technology resources, among other things.

Some implementations described herein may leverage existing unutilized and/or underutilized parking infrastructure to store vehicles in an inventory of vehicles associated with one or more organizations. For example, various businesses and/or other organizations may operate establishments (e.g., malls, grocery stores, stadiums, churches, colleges or universities, and/or the like) that are situated on or near land containing a parking lot or parking garage. Additionally, or alternatively, the parking lot or parking garage may be unaffiliated with any establishment. In some implementations, a service may be provided whereby these businesses and/or other organizations can make surplus (i.e., unused) parking spaces available to other organizations having an inventory of vehicles that needs to be stored somewhere. For example, in one use case, the inventory of vehicles may comprise vehicles that are available to purchase, lease, or rent from a vehicle dealer (e.g., a seller and/or a renter of vehicles). In another example use case, the inventory of vehicles may comprise fleet vehicles that are owned or rented by a particular business, government agency, or other organization (e.g., a taxicab company, a public utility, a delivery service, and/or the like).

In this way, the surplus parking spaces may be used to store vehicles that would otherwise need to be stored in a dedicated facility, which may increase utilization of existing parking infrastructure, reduce a need to dedicate additional land to storing vehicles, and/or the like. Furthermore, in this way, the organization(s) offering the surplus parking spaces may monetize unused or underused parking infrastructure while also conserving technological, human, and/or other resources that would otherwise be expended maintaining the surplus parking spaces, seeking out revenue streams, and/or the like.

In some implementations, organizations that have surplus parking spaces may register one or more of the surplus parking spaces with a vehicle storage platform and optionally define one or more terms and/or conditions for use of the surplus parking spaces (e.g., a cost to rent a space or a set of spaces, a term or time period during which a space or a set of spaces is available, a type of vehicle that is preferred or required to be stored in the surplus parking spaces, and/or the like). In some implementations, another party that has an inventory of vehicles to be stored may communicate with the vehicle storage platform to locate the surplus parking spaces and enter into a transaction to purchase or rent one or more of the surplus parking spaces. For example, the party with the inventory of vehicles to be stored could enter into one or more transactions to purchase or rent surplus parking spaces at multiple different locations in a given geographic area. The vehicles in the inventory of vehicles could then be stored at the different locations, with machine learning algorithms optionally employed to determine storage locations for each vehicle based on one or more factors that are chosen to optimize efficiency (e.g., to minimize fuel consumption, increase battery life, reduce wear and tear, and/or the like).

In this way, the inventory of vehicles may be stored in a substantially lotless manner (i.e., without a dedicated lot or garage owned, rented, or otherwise operated by the party associated with the inventory of vehicles). In this way, a cost to store vehicle inventories may be reduced, technological resources may be conserved by avoiding a need to equip a dedicated lot or garage with sensors, communication devices, and/or other information technology resources often used to manage vehicle lots, and/or the like.

In some implementations, the vehicle storage platform described herein may further enable a user to view the inventory of vehicles stored in the surplus parking spaces that are made available by the parking provider(s) and receive, from the user, a request to use one or more of the vehicles in the inventory of vehicles stored in the surplus parking spaces. For example, in some implementations, the party associated with the inventory of vehicles may be a vehicle dealer (e.g., a seller or renter of vehicles) and the user may be a customer wishing to take the one or more vehicles out for a test drive, a customer desiring a rental vehicle, and/or the like. In another example, the inventory of vehicles may be a vehicle fleet associated with a business or other organization and the user may be an employee, agent, contractor, and/or another individual authorized to use a vehicle in the vehicle fleet (e.g., for business purposes, temporary personal use, and/or the like). In some implementations, the user may specify a starting location and/or other suitable parameters for the requested use of the vehicle (e.g., a starting and/or ending time, a quantity of miles to be driven, and/or the like). In some implementations, when the starting location differs from the storage location for the requested use of the vehicle, the vehicle storage platform may orchestrate delivery of the vehicle from the storage location to the starting location. In some implementations, when the user is finished using the vehicle, the vehicle storage platform may allow the user to leave the vehicle in one or more storage locations (e.g., the original storage location, the starting location for the requested use, another location at which vehicles in the inventory of vehicles are stored, and/or the like.

In this way, several different stages of a process for enabling a user to specify a starting location for a use of a vehicle and orchestrating delivery to the starting location may be automated, which may remove human subjectivity and waste from the process, and which may improve speed and efficiency of the process and conserve computing resources (e.g., processor resources, memory resources, and/or the like). Furthermore, implementations described herein use a rigorous, computerized process to perform tasks or activities that were not previously performed or were previously performed using subjective human intuition or input. For example, currently there does not exist a platform that manages an inventory of vehicles and processes requests for vehicles, whereby users can request to have a vehicle delivered to a convenient location prior to usage of the vehicle and/or left at a convenient location following the usage of the vehicle. Accordingly, hardware resources conventionally used to manage a vehicle lot (e.g., sensors, communication devices, telematics systems, and/or the like) can be conserved. Furthermore, automating processes to deliver vehicles to user-requested locations may conserve environmental resources (e.g., by reducing congestion on public roadways because delivery can be scheduled during low-traffic periods, a user wishing to test drive vehicles from different vehicle dealers do not have to drive to multiple dealerships that may not be close to the user or to each other, and/or the like).

FIGS. 1A-1F are diagrams of one or more example implementations 100 described herein. For example, in example implementation(s) 100, a vehicle storage platform may communicate or otherwise interface with a parking provider device associated with a first organization that owns, rents, and/or otherwise operates a parking facility (e.g., a parking lot, parking space, or parking garage). In some implementations, the vehicle storage platform may further communicate or otherwise interface with an inventory management device associated with a second organization that has an inventory of vehicles to be stored while the vehicles are not in use and with one or more user devices associated with one or more users that may request to use one or more of the vehicles in the inventory of vehicles. For example, in some implementations, the inventory of vehicles may include vehicles that are available to purchase, lease, or rent from the second organization, fleet vehicles that are available for use by employees, agents, and/or other users authorized by the second organization, and/or the like. As will be described in further detail herein, the vehicle storage platform may facilitate a transaction whereby at least a portion of the vehicles in the inventory of vehicles can be stored at the parking facility operated by the first organization. As such, in some implementations, the one or more user devices may be employed to request a test drive, to request a rental vehicle, to request a fleet vehicle for business and/or personal use, and/or the like, and the vehicle storage platform may perform one or more orchestration tasks to facilitate the requested vehicle usage.

As shown in FIG. 1A, and by reference number 102, the parking provider device may identify a set of surplus parking spaces to be made available for use by one or more third parties. For example, in some implementations, the first organization may operate an establishment such as a mall, a grocery store, a department store, a stadium, a church, an office park, a college or university, and/or another suitable establishment that has a parking facility available for customers, patrons, guests, students, and/or the like. In another example, the first organization may be a municipality that rents out or otherwise makes street parking spaces available for third party use, which may provide the municipality with a revenue stream without having to deploy any additional parking infrastructure. Additionally, or alternatively, the first organization may provide the parking facility without affiliation with any establishment (e.g., a standalone parking lot or parking garage).

In some implementations, the parking provider device may identify the surplus parking spaces using one or more artificial intelligence techniques, such as machine learning, deep learning, and/or the like (e.g., based on observed patterns of use over time, predicted future usage, and/or the like). For example, in some implementations, the parking facility may be equipped with one or more sensors and/or other suitable devices that can detect when a parking space is occupied (e.g., pressure sensors, proximity sensors, cameras, and/or the like), which can be used to determine occupancy patterns at various levels of granularity (e.g., a quantity of parking spaces that are occupied at different times of day, on certain days, on weekends versus weekdays, during different seasons, and/or the like). In another example, the one or more artificial intelligence techniques may consider one or more variables to predict future usage of the parking spaces that are available at the parking facility (e.g., a retail establishment may expect usage of the parking spaces to increase during an upcoming holiday shopping season, following a marketing campaign, and/or the like, a stadium may expect usage to increase on the day of a scheduled event, and/or the like). Additionally, or alternatively, the surplus parking spaces may be identified using heuristic techniques, manual techniques, and/or the like.

As further shown in FIG. 1A, and by reference number 104, the parking provider device may register the surplus parking spaces with the vehicle storage platform to make the surplus parking spaces available for use by one or more third parties. For example, in some implementations, the parking provider device may register a certain quantity of the surplus parking spaces to be added to available parking inventory managed by the vehicle storage platform. Furthermore, in some implementations, the parking provider device may provide location information associated with the quantity of the surplus parking spaces to be added to the available parking inventory (e.g., Global Positioning System (GPS) coordinates associated with each individual parking space, coordinates associated with the parking facility where the surplus parking spaces are located, information defining a geofence in which one or more parking spaces are located, and/or the like).

As further shown in FIG. 1A, and by reference number 106, the parking provider device may further specify one or more desired usage criteria for the surplus parking spaces registered with the vehicle storage platform. For example, in some implementations, the desired usage criteria may specify when the surplus parking spaces are available (e.g., weekdays, weekends, evenings, and/or the like), an availability period for the surplus parking spaces (e.g., persistently, during certain months, and/or the like), and/or a rental term for the surplus parking spaces (e.g., hourly, daily, weekly, monthly, and/or the like). Additionally, or alternatively, the desired usage criteria may specify one or more vehicle types and/or other vehicle parameters. For example, where the parking facility is situated near a retail establishment having a clientele that tends to prefer a certain type of vehicle, the desired usage criteria may express a preference that the surplus parking spaces be used to store vehicles consistent with the type of vehicle preferred by the retail establishment's clientele (e.g., a sporting goods store may request that sport utility vehicles be stored in the surplus parking spaces to attract potential customers to the sporting goods store).

In this way, implementations described herein may enable the parking provider device to identify the surplus parking spaces with an increased accuracy and precision (e.g., by employing artificial intelligence techniques that take into consideration observed usage patterns over time, factors that may indicate future increases and/or decreases in the surplus parking spaces that may be available for use by third parties, and/or the like). In this way, by making surplus parking spaces available for third parties to store vehicles, utilization associated with the parking facility may be increased, which may reduce a need to dedicate additional land to parking facilities that the third parties may have otherwise used to store their vehicles. In this way, computing resources (e.g., processor resources, memory resources, communication resources, and/or the like) may be conserved, such as computing resources that governments, municipalities, private entities, and/or the like may have otherwise expended on efforts to efficiently plan and regulate land usage in a manner that serves community needs, safeguards natural resources, and/or the like.

Figure 1B:
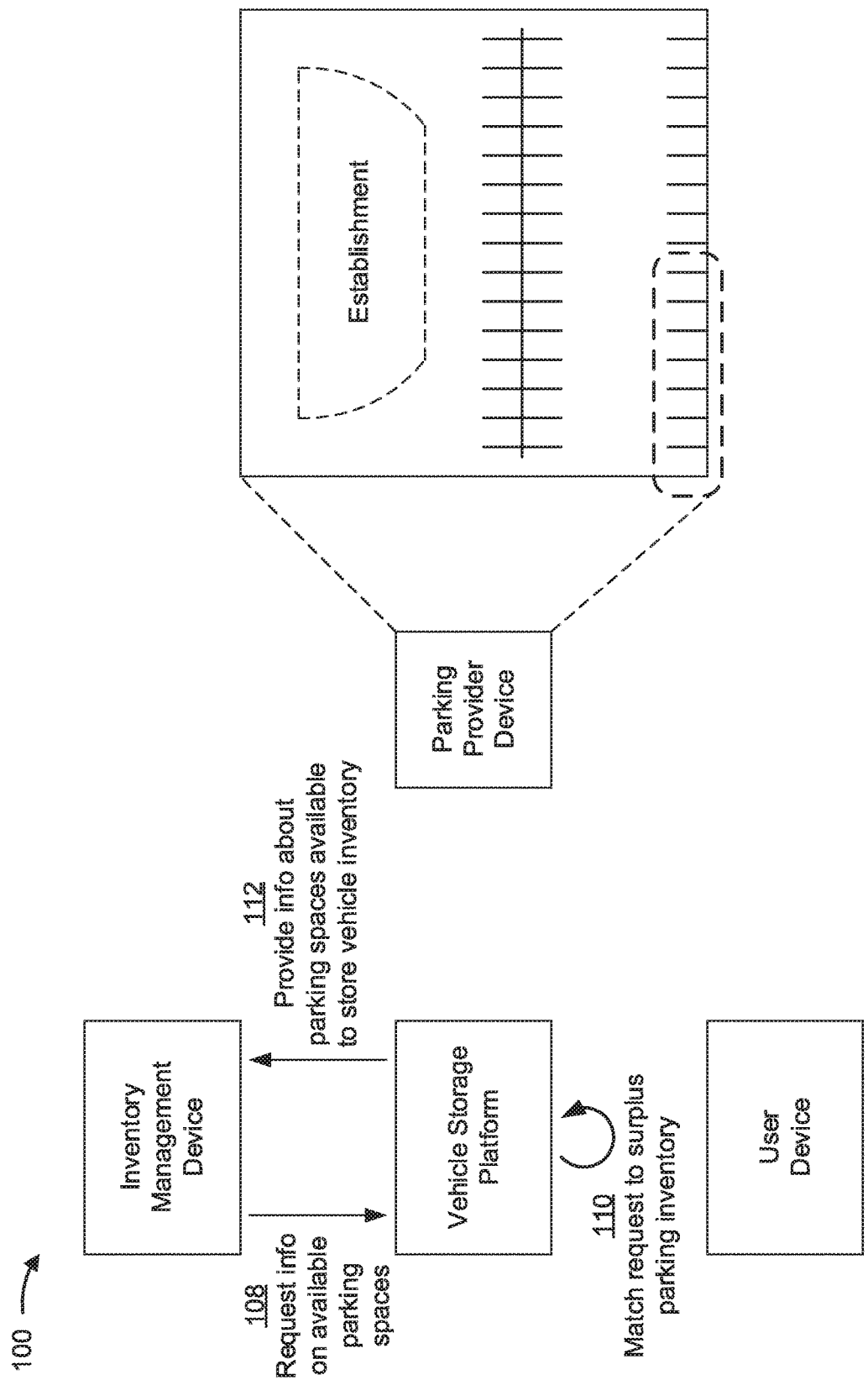

As shown in FIG. 1B, and by reference number 108, the vehicle storage platform may receive, from an inventory management device, a request for information on available parking spaces (i.e., surplus parking spaces registered by one or more parking provider devices). The inventory management device may be associated with the second organization having the inventory of vehicles to be stored while the vehicles are not in use. For example, in some implementations, the second organization may be a vehicle dealer (e.g., a seller or renter of vehicles), a taxicab company, a public utility, a government agency, a delivery service, and/or any other suitable organization that has an inventory of vehicles (or vehicle fleet) to be stored while the vehicles are not in use. In some implementations, the request received from the inventory management device may include one or more parameters to limit a search of the available parking spaces registered with the vehicle storage platform. For example, in some implementations, the one or more parameters may relate to the vehicles to be stored in the available surplus parking spaces registered with the vehicle storage platform, desired usage terms (e.g., available rental periods, times, prices, and/or the like), a desired quantity of parking spaces, one or more desired storage locations, profile information associated with a likely user of the vehicles to be stored in the available surplus parking spaces, and/or the like.

As further shown in FIG. 1B, and by reference number 110, the vehicle storage platform may match the request received from the inventory management device to the surplus parking inventory registered with the vehicle storage platform. For example, the request received from the inventory management device may specify a desired quantity of parking spaces, and the vehicle storage platform may attempt to find the desired quantity of parking spaces at one or more parking facilities that have surplus parking inventory registered with the vehicle storage platform (e.g., if the request is for twenty-five (25) parking spaces, the vehicle storage platform may find a single parking facility having 25 or more surplus parking spaces, multiple parking facilities that collectively have 25 or more surplus parking spaces, and/or the like).

Furthermore, in some implementations, the vehicle storage platform may consider the usage criteria specified by the parking provider device(s) and/or the one or more parameters that the inventory management device provided to limit the search of the available parking spaces. For example, the request received from the inventory management device may express a preference to distribute the desired quantity of parking spaces among multiple different locations to increase a chance that there will be at least one convenient location for any given user of the vehicles to be stored in the desired quantity of parking spaces. In another example, the vehicle storage platform may take into consideration the type of vehicles to be stored (e.g., specific make and model, general type such as convertible, SUV, crossover, sedan, and/or the like) and/or the type of establishment(s), if any, situated near or otherwise associated with the parking facilities. Additionally, or alternative, the vehicle storage platform may take into consideration historical information related to previous vehicle sales (e.g., parking spaces at or near locations where vehicles were stored and successfully sold).

In some implementations, the vehicle storage platform may create one or more models to evaluate the information related to the available parking spaces (e.g., where the parking spaces are located, whether a parking space is near another parking space, how many parking spaces are near each other, and/or the like) and the information concerning the vehicle inventory. The vehicle storage platform may use the one or more models to determine a score for each parking space (or a subset of parking spaces) relative to the one or more parameters that the inventory management device provided to limit the search of the available parking spaces. For example, in some implementations, the score assigned to each parking space or set of parking spaces may generally reflect how well the parking space or set of parking spaces matches the parameters provided by the inventory management device. Accordingly, the vehicle storage platform may select certain parking spaces that are most suitable for the vehicles in the inventory of vehicles based on the scores assigned to the parking spaces.

As further shown in FIG. 1B, and by reference number 112, the vehicle storage platform may provide, to the inventory management device, information about parking spaces that are available to store the vehicles in the inventory of vehicles associated with the second organization. For example, in some implementations, the information provided to the inventory management device may be provided in an interface that indicates one or more locations that have surplus parking spaces that are at least a partial match for one or more parameters contained in the request from the inventory management device. Additionally, or alternatively, the request from the inventory management device may specify one or more required parameters and one or more optional parameters, in which case the information provided to the inventory management device may indicate one or more locations that match at least the one or more required parameters. Additionally, or alternatively, the information provided to the inventory management device may include multiple locations that have available surplus parking spaces, with the multiple locations optionally ranked according to one or more metrics (e.g., a degree to which the parameters in the request from the inventory management device align with the usage criteria specified by the parking provider device(s) associated with the multiple locations).

In this way, several different stages of a process for finding suitable locations to store vehicle inventory are automated, which may remove human subjectivity and waste from the process, and which may improve speed and efficiency of the process and conserve computing resources (e.g., processor resources, memory resources, and/or the like) that may otherwise be wasted searching real estate listings for suitable undeveloped sites where a parking facility can be built, developed sites having a parking facility available to purchase or rent, and/or the like. Furthermore, storing an inventory of vehicles in surplus parking spaces associated with existing parking infrastructure may enable substantially decentralized and lotless vehicle storage, which may reduce computing overhead (e.g., computing resources that would otherwise need to be used to run lot management software, deploy sensors, security systems, communication devices, and/or other hardware to support managing a centralized lot, and/or the like). Furthermore, implementations described herein use a rigorous, computerized process to perform tasks or roles that were not previously performed or were previously performed using subjective human intuition or input. For example, currently there does not exist a technique to locate existing unutilized or underutilized parking infrastructure that could be put to more efficient use by storing vehicle inventories. Further still, providing an automated process for finding suitable locations to store vehicle inventories may offer other benefits, such as conserving natural resources (e.g., raw materials, fuel, undeveloped land, and/or the like that may be consumed or destroyed building new parking facilities), promoting economic activity that may increase revenues for the organization(s) offering the surplus parking spaces, reduce overhead for the organization(s) utilizing the surplus parking spaces to store vehicles, improve quality of life within a local community and/or society at-large, and/or the like.

Figure 1C:
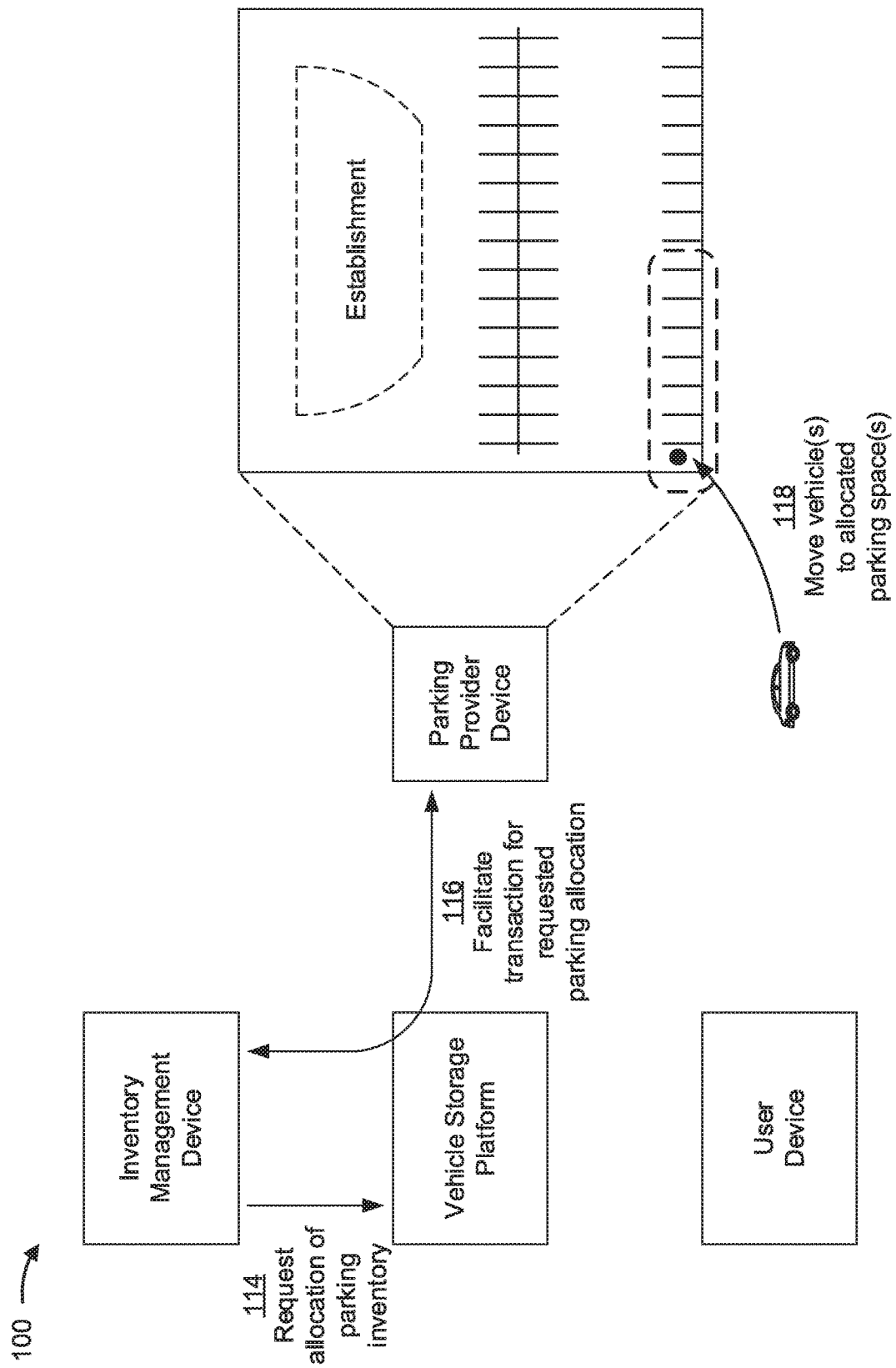

As shown in FIG. 1C, and by reference number 114, the vehicle storage platform may receive, from the inventory management device, a request for a given allocation of the available parking inventory registered with the vehicle storage platform. For example, in some implementations, the request received from the inventory management device may indicate one or more locations associated with the requested allocation of the available parking inventory, a quantity of parking spaces to be utilized at each of the one or more locations, proposed terms of an offer to purchase, rent, and/or otherwise obtain rights to use the quantity of parking spaces at each of the one or more locations, acceptance of terms that the organization(s) associated with each of the one or more location offered for the purchase, rent, and/or other rights to use the quantity of parking spaces, and/or the like.

As further shown in FIG. 1C, and by reference number 116, the vehicle storage platform may facilitate a transaction for the requested parking allocation between the inventory management device and the parking provider device. In some implementations, the transaction may be a rental and/or purchase agreement between the respective organizations associated with the parking provider device and the inventory management device (e.g., between the first organization offering the surplus parking space for use by third parties and the second organization having the inventory of vehicles to be stored while the vehicles are not in use).

For example, the rental and/or purchase agreement may specify that, subject to payment of an agreed upon value, the organization associated with the inventory management device has the right to use a given quantity of parking spaces at the parking facility associated with the parking provider device (e.g., shown in FIG. 1C as dashed lines encircling some of the parking spaces at the parking facility). In some implementations, the agreement may specify additional conditions, restrictions, and/or the like regarding the usage of the given quantity of parking spaces. Furthermore, in some implementations, the vehicle storage platform may collect a service charge based on facilitating the transaction (e.g., the service charge may be collected from the organization associated with the parking provider device, added to the value that the organization associated with the inventory management device pays for the right to use the given quantity of parking spaces, and/or the like).

In some implementations, once the transaction for the requested parking allocation has been suitably processed, the parking spaces allocated to the organization associated with the inventory management device may be marked as unavailable and removed from the inventory of parking spaces registered with the vehicle storage platform.

As further shown in FIG. 1C, and by reference number 118, the organization associated with the inventory management device may move one or more vehicles to the allocated parking spaces. For example, in some implementations, the organization associated with the inventory management device may have one or more employees or otherwise hire one or more drivers to move the one or more vehicles to the allocated parking spaces. Additionally, or alternatively, the inventory of vehicles may include one or more autonomous vehicles, which may be instructed to follow a particular path to the allocated parking spaces. In some implementations, the parking spaces that the one or more vehicles are moved to may correspond to recommended storage locations determined by the vehicle storage platform. For example, in some implementations, the vehicle storage platform may receive, from the inventory management device, a request for a recommended storage location for one or more vehicles, which may include profile information associated with likely users of the one or more vehicles, information related to the one or more vehicles (e.g., make, model, type, and/or the like, vehicle conditions such as battery state, tire tread, odometer miles, and/or the like), and/or information related to likely uses of the vehicle (e.g., likely start locations for a test drive or other use of the vehicles). As such, in some implementations, the vehicle storage platform may transmit, to the inventory management device, information indicating the recommended storage location(s) for the one or more vehicles, which may be determined using one or more artificial intelligence or machine learning techniques.

For example, in some implementations, the vehicle storage platform may evaluate some or all of the data related to the surplus parking spaces that are available to store vehicles and some or all of the data related to the vehicle inventories to be stored in the surplus parking spaces to assign a score to each parking space for each vehicle. The score may reflect how suitable a parking space is for the vehicle and/or how suitable the vehicle is for the parking space. Accordingly, based on the score assigned to each parking space, the vehicle storage platform may match recommended storage locations to each vehicle. Furthermore, in some implementations, the matching may take into account various factors and not simply match each vehicle to a highest scoring parking space (e.g., vehicles that are not fuel efficient may be stored at locations that are close to a gas station even though parking spaces at another location may be more likely to attract customers interested in purchasing or leasing such vehicles).

In some implementations, the recommended storage location(s) may be selected from among multiple different locations where the organization associated with the inventory management device has obtained rights to use surplus parking inventory based on a comparison of information provided with the request for the recommended storage location, profile information associated with clientele at establishments (if any) in proximity to the multiple different locations, and various factors that may be relevant to an ability to move a given vehicle from the storage location to another location where a user may wish to pick up the vehicle. For example, in one relatively simple use case, the recommended storage locations may be selected to minimize a frequency (e.g., how often) or distance (e.g., how many miles) the vehicle will need to be moved to likely starting locations for requested uses of the vehicles. In another example use case, the recommended storage locations may be selected to foster a symbiotic relationship between the organization storing the vehicles and the organization(s) offering the surplus parking spaces (e.g., matching likely users of the vehicles to likely patrons of an establishment associated with the surplus parking spaces to attract the likely users of the vehicles to the establishment and to attract the likely patrons of the establishment to the vehicles).

Additionally, or alternatively, the vehicle storage platform may employ substantially more robust artificial intelligence and/or machine learning algorithms to determine a recommended storage location for each vehicle. For example, in a given community and/or other locale, there may be many different locations that may have small, medium, and/or large quantities of surplus parking spaces registered with the vehicle storage platform and many different organizations that may have small, medium, and/or large inventories of vehicles to be stored. In some implementations, the vehicles in some of these vehicle inventories may be associated with vehicle dealers (e.g., sellers or renters offering the vehicles for sale, lease, or rental), while others may be fleet vehicles that can be checked out by authorized users for business and/or personal use, and/or the like. Accordingly, there may be various factors that relate to where to store a vehicle, where a user may wish to pick up a vehicle, and/or the like. In general, the vehicle storage platform may employ the artificial intelligence and/or machine learning algorithms to minimize a need to move a vehicle from a storage location to a likely starting location for an eventual use of the vehicle (e.g., the recommended storage location and the likely starting location for an eventual use may ideally be one and the same). Furthermore, in some implementations, the artificial intelligence and/or machine learning algorithms may be further configured to account for various contingencies and variables that may make moving a vehicle from one location to another easier and/or more difficult (e.g., weather, traffic, street closures, an amount of gas in the vehicle, a quantity of miles on the vehicle, time of day, day of week, time of year, and/or the like). Additionally, or alternatively, the information used to determine the recommended storage location(s) may include historical data related to locations where vehicle sales have occurred.

In this way, several different stages of the process for determining an appropriate storage location, delivery location, temporary holding space, and/or the like for a given vehicle (or set of vehicles) are automated, which may remove human subjectivity and waste from the process, and which may improve speed and efficiency of the process and conserve various resources (e.g., processor resources, memory resources, vehicle resources, and/or the like). Furthermore, implementations described herein use a rigorous, computerized process to perform tasks or roles that were not previously performed or were previously performed using subjective human intuition or input. For example, currently there does not exist a technique to model various parameters that relate to available parking spaces distributed throughout a community, vehicle inventories that need storage locations, environmental and vehicular variables that may impact an ability to move vehicles from one location to another, different contemplated vehicle uses, and/or the like.

Finally, automating the process for determining an appropriate storage location, delivery location, temporary holding space, and/or the like for a given vehicle (or set of vehicles) conserves resources that could otherwise be wasted in subjectively assessing appropriate vehicle storage locations, moving vehicles from one location to another, and/or the like, while also reducing externalities such as additional congestion on public roadways, environmental pollution from vehicle emissions, and/or the like.

Figure 1D:
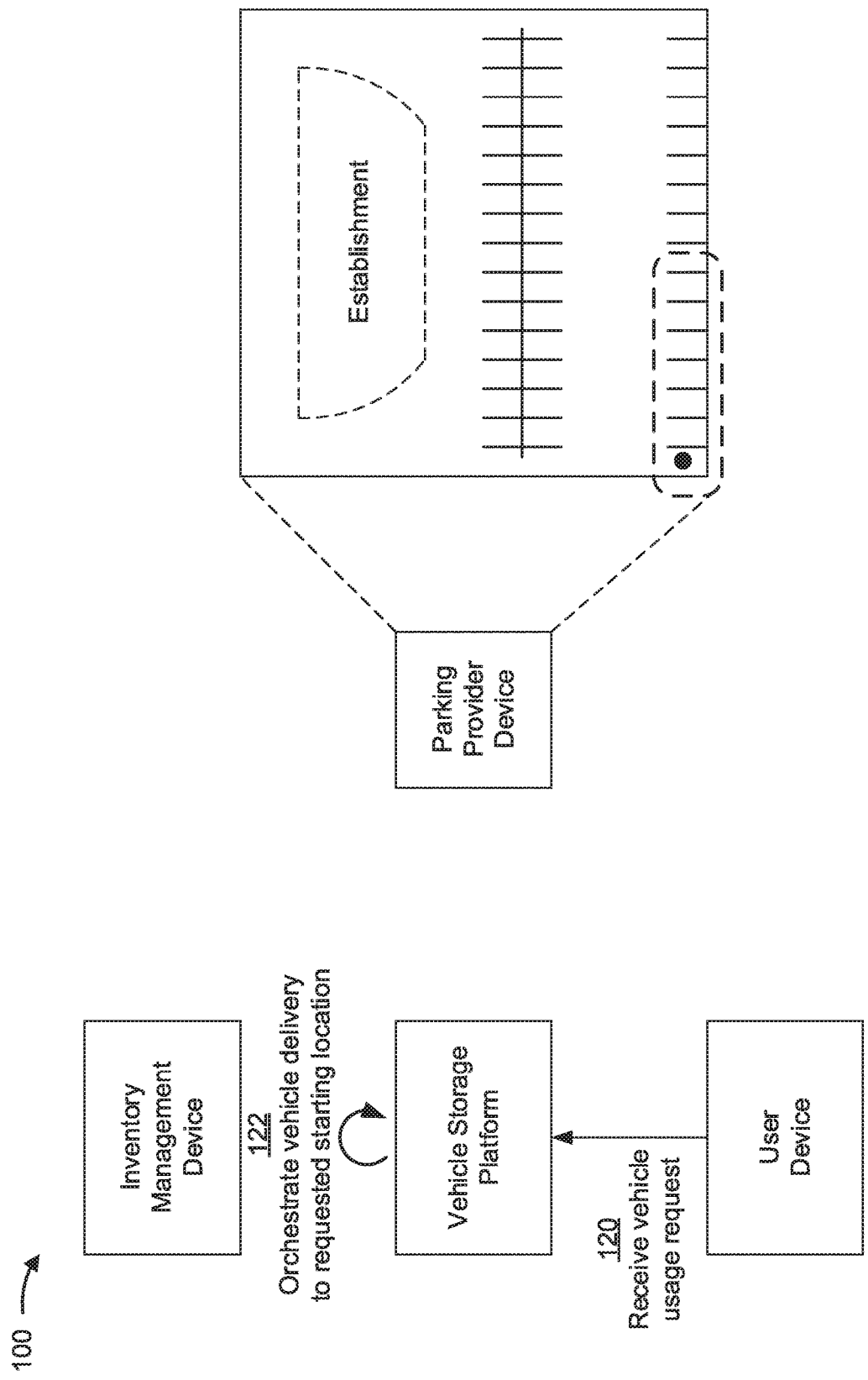

As shown in FIG. 1D, and by reference number 120, the vehicle storage platform may receive, from a user device, a request to use one or more vehicles in the inventory of vehicles stored at the parking facility associated with the parking provider device. For example, as noted above, the requested use may be for a test drive where the inventory of vehicles is associated with a seller of vehicles. Additionally, or alternatively, the user device may request test drives for multiple vehicles that may be associated with one or multiple vehicle dealers. In another example, the requested use may be a personal use where the inventory of vehicles is associated with a renter of vehicles (e.g., a car-sharing network, a car rental company, and/or the like). In still another example, the requested use may be for an authorized business or personal purpose where the inventory of vehicles is a vehicle fleet (e.g., taxicabs, delivery vehicles, government agency vehicles, and/or the like).

In some implementations, the request from the user device may optionally specify a starting time and/or a starting location for the requested use of the vehicle, where the starting location may differ from a storage location for the vehicle. For example, in some implementations, the starting location may be one of a plurality of locations where vehicles in the inventory of vehicles are stored and/or a user-specified location independent of the location(s) where vehicles in the inventory of vehicles are stored. Furthermore, in some implementations, the request from the user device may identify the vehicle for the requested use according to one or more parameters, such as an identifier associated with a specific vehicle, a type of vehicle (e.g., a sedan, minivan, convertible, and/or the like), a specific make and model that the user may be interested in purchasing, leasing, or renting, and/or the like.

As further shown in FIG. 1D, and by reference number 122, the vehicle storage platform may orchestrate delivery of a vehicle that corresponds to the one or more parameters provided in the request to the starting location further provided in the request when the storage location for the vehicle differs from the starting location for the requested use. In some implementations, orchestrating the vehicle delivery may be performed in various ways and depend on various factors, as described in more detail below. For example, when there are multiple vehicles that correspond to the one or more parameters provided in the request, the vehicle storage platform may orchestrate delivery of a vehicle located closest to the starting location for the requested use of the vehicle. Additionally, or alternatively, the user may wish to test drive multiple different vehicles (e.g., from the same or different vehicle dealers), in which case the vehicle storage platform may orchestrate delivery of the multiple different vehicles to the starting location.

Figure 1E:
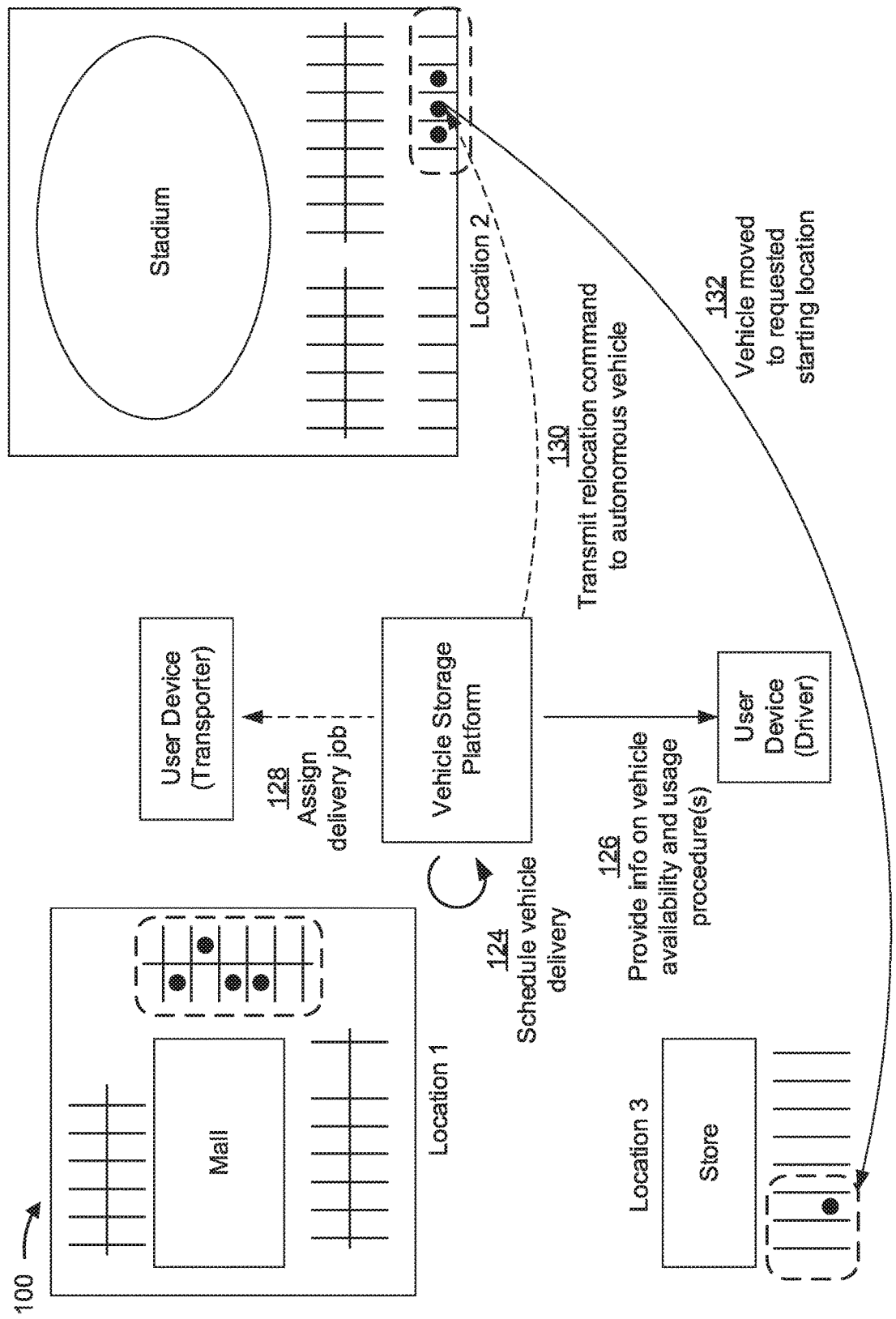

As shown in FIG. 1E, and by reference number 124, the vehicle storage platform may schedule delivery of the one or more vehicles to the starting location. In some implementations, as noted above, the scheduled delivery may depend on various factors, which may include a distance between the storage location and the starting location, current and/or predicted weather, current and/or predicted traffic, current and/or planned street closures, an amount of gas in the vehicle(s), battery health, tire health, a number of miles on a vehicle odometer, a time of day, a day of week, a time of year, a prediction of whether all parking spaces at the starting location will be occupied before the vehicle arrives at the starting location, a prediction as to whether a user currently using the vehicle will return the vehicle before the starting time, and a prediction of whether someone will be able to move the vehicle to the starting location before the starting time, to name a few. In some implementations, the vehicle storage platform may employ one or more artificial intelligence and/or machine learning algorithms to schedule the delivery of the one or more vehicles to a starting location that may be selected from among multiple possible spaces (e.g., open spaces) where the vehicle can be delivered based on one or more of the above-mentioned factors and/or the like.

For example, in a relatively straightforward use case, the vehicle storage platform may schedule delivery of a vehicle that is located closest to the starting location for the requested use of the vehicle when there are multiple vehicles that correspond to the one or more parameters provided in the request. Other factors may make the delivery problem more complex, however. For example, with respect to the current and/or predicted weather, the vehicle storage platform may attempt to schedule delivery during a time of good weather conditions rather than a period of heavy precipitation, wind, and/or the like (e.g., if weather conditions are expected to deteriorate in a few hours, the delivery may be scheduled immediately, or the delivery may alternatively be delayed if current weather conditions are poor but forecasted to improve in a few hours). In other examples, the vehicle storage platform may schedule the delivery during a time when traffic conditions are usually favorable (e.g., outside rush hour), from a storage location that does not have any current and/or planned street closures in a route to the starting location, and/or the like. In still other examples, the delivery may be scheduled based on vehicle conditions (e.g., scheduling delivery of a vehicle that has a sufficient amount of gas to get to the starting location and still allow the user to carry out the requested use, scheduling delivery of a vehicle that has been dormant for a while to prevent battery problems, tire flat-spotting, stale gas issues, and/or other problems that can develop when a vehicle is not moved or driven for an extended period, and/or the like). Additionally, or alternatively, the vehicle storage platform may select a given vehicle to be delivered in order to increase visibility of the vehicle (e.g., to attract potential purchasers or users), to facilitate training of the model(s) used in the machine learning algorithms, and/or the like. In still another example, a confidence value may be assigned to a prediction as to whether a user currently using the vehicle will return the vehicle before the starting time, where the confidence may decrease as the start time approaches and/or the further that the vehicle is from the starting location (e.g., possibly triggering contingencies whereby the current user is asked to leave the vehicle at the starting location, a substitute vehicle is delivered, and/or the like).

As further shown in FIG. 1E, and by reference number 126, the vehicle storage platform may provide, to the user device, information regarding vehicle availability and any applicable usage procedures. For example, based on one or more of the above-mentioned factors and/or the like, the vehicle storage platform may determine an approximate time when the vehicles will arrive at the requested starting location and transmit, to the user device, information indicating the approximate time when the vehicle will arrive at the starting location. Additionally, or alternatively, the vehicle storage platform may determine an alternative starting location and provide the user device with information indicating the alternative starting location (e.g., where conditions are such that the vehicle cannot be delivered to the requested starting location, the vehicle will arrive at the requested starting location later than the requested time but could be available at another location by the requested time, and/or the like). Furthermore, with respect to the usage procedures, the vehicle storage platform may indicate one or more authentication requirements that the user needs to provide prior to use (e.g., driver's license information, proof of insurance, employment information, and/or the like) and enable the user to enter and drive the vehicle only when the appropriate authentication requirements have been satisfied.

In some implementations, the usage procedures may further specify one or more drop-off locations where the user is permitted to leave the vehicle after the user is finished using the vehicle (e.g., the starting location, the original storage location, a different location where the organization associated with the vehicle has available parking spaces, a location where a different user wishes to pick up the vehicle, and/or the like). In some implementations, the vehicle storage platform may send, to the user device and/or a navigation device of the vehicle, route instructions to the one or more drop-off locations where the user is permitted to leave the vehicle after the user is finished using the vehicle. Additionally, or alternatively, the usage procedures may place one or more constraints on the usage of the vehicle. For example, in some implementations, the vehicle storage platform may define a geofence for the usage of the vehicle such that the user is not permitted to take the vehicle beyond boundaries of the geofence. In other examples, the usage procedures may place a limit on a number of miles that can be driven, an amount of gas to be left in the vehicle when the vehicle is returned, and/or the like.

As further shown in FIG. 1E, and by reference number 128, the vehicle storage platform may assign a job to deliver the vehicle to the starting location to a user device, referred to hereinafter as a transporter user device. In some implementations, the transporter user device may be associated with an employee, agent, or other user authorized to move vehicles on behalf of the organization associated with the inventory of vehicles that includes the vehicle to be moved. Additionally, or alternatively, the transporter user device may be associated with an employee, agent, or other user authorized to move vehicles on behalf of the vehicle storage platform (e.g., where moving vehicles between locations is a service offered to organizations who use the vehicle storage platform to store vehicle inventories). In another alternative, the transporter user device may be associated with a member of the public, where the vehicle storage platform advertises availability of the vehicle to be moved via a crowd-sourcing interface.

For example, in some implementations, the vehicle storage platform may advertise that the vehicle is available to use via the crowd-sourcing interface and further specify a cost to utilize the vehicle until a specified time (e.g., the starting time for the requested use). In addition, the vehicle storage platform may indicate that use of the vehicle is subject to a requirement that the vehicle is to be left at the starting location for the requested use of the vehicle no later than the specified time. In this way, a user who needs to use a vehicle (e.g., to run personal errands) can obtain the vehicle from the vehicle storage platform while also fulfilling the need to move the vehicle from the storage location to the starting location for the requested use. Furthermore, in some implementations, the crowd-sourcing interface may be implemented in a manner analogous to a reverse auction, whereby the cost to utilize the vehicle is reduced as the starting time for the requested use approaches until if and/or when a user agrees to pay the cost to the utilize the vehicle. The vehicle storage platform may collect a payment for the cost that the user agrees to pay to utilize the vehicle, which may optionally be shared with the organization with the vehicle inventory that includes the vehicle (e.g., to offset depreciation, refueling costs, and/or the like attributable to the usage).

In another example, rather than having the user of the transporter user device pay to utilize the vehicle, the vehicle storage platform may use the crowd-sourcing interface to pay a member of the public to move the vehicle to the starting location. In this example, the vehicle storage platform may advertise, via the crowd-sourcing interface, an offer to pay a given amount to move the vehicle from the storage location to the starting location for the use of the vehicle. If and/or when a user accepts the offer and completes delivery to the starting location, the amount may be credited to an account associated with the transporter user device and another amount may optionally be charged to an account associated with the organization associated with the vehicle for orchestrating the delivery to the starting location for the use of the vehicle. In some implementations, the vehicle storage platform may further increase the amount to be paid to move the vehicle to the starting location as the starting time for the requested use approaches (e.g., to increase the likelihood that a user will accept the offer in sufficient time to relocate the vehicle to the starting location before the requested starting time). Additionally, or alternatively, the amount to be paid to move the vehicle may be scaled according to how close the user brings the vehicle to the starting location (e.g., if the user moves the vehicle half of the distance from the storage location to the starting location, the user may be paid half the amount that would have been paid if the user had taken the vehicle all the way to the starting location).

As further shown in FIG. 1E, and by reference number 130, the vehicle storage platform may alternatively transmit a relocation command to the vehicle when the vehicle is an autonomous vehicle. As such, the relocation command may generally cause the vehicle to autonomously drive from the storage location of the vehicle to the starting location for the requested use. In some implementations, the relocation command may instruct the vehicle to start driving to the starting location at a specific time or within a specific time window, to start driving at a suitable time that will ensure that the vehicle arrives at the starting location in advance of the starting time for the requested use, to take a specific route to the starting location (e.g., to avoid traffic or road closures, and/or the like).

As further shown in FIG. 1E, and by reference number 132, the vehicle may be moved to the requested starting location, either by the user associated with the transporter user device or independently based on the relocation command based on the vehicle having autonomous driving capabilities. In some implementations, the vehicle storage platform may track real-time movement of the vehicle, including while the vehicle is in-transit to the starting location. As such, in some implementations, the real-time location and/or movement of the vehicle may be made available to the user device associated with the user who provided the request to use the vehicle, which may allow the user to know when the vehicle has arrived or will arrive at the starting location. Additionally, or alternatively, the vehicle storage platform may transmit a notification to the user device to indicate that the vehicle is ready for use based on the real-time movement indicating that the vehicle has arrived at the starting location for the test drive. Furthermore, when the movement to the starting location is achieved via one or more of the crowd-sourcing methods described above, a profile of a user associated with the transporter user device may be updated based on whether the vehicle arrived at the starting location before the requested starting time, based on whether there was any damage to the vehicle outside normal wear and tear, based on whether the user complied with all usage constraints (e.g., geofences, mileage limits, refueling requirements, and/or the like). In some implementations, the information in the profile associated with the user may thus be consulted in the future to determine whether the user is allowed to continue moving vehicles, to provide rewards or incentives for good performance over time, and/or the like.

As shown in FIG. 1F, and by reference number 134, the vehicle storage platform may receive information reporting vehicle locations and/or movement from one or more user devices and/or one or more vehicles. For example, in some implementations, certain vehicles may be equipped with navigation and/or other position determining capabilities as well as capabilities to engage in uplink communications. In such cases, the vehicle(s) may report a location associated therewith to the vehicle storage platform, which may allow the vehicle storage platform to determine a real-time location and/or real-time movement of the vehicle(s). Additionally, or alternatively, the vehicle storage platform may track vehicle locations and/or movements by associating vehicles with user devices belonging to users who are driving the vehicles. For example, many electronic devices have position determining capabilities and uplink communication capabilities, whereby locations and/or movements of the user devices may be tracked as proxies for the locations and/or movements of the vehicles in which the user devices are located. Additionally, or alternatively, one or more parking facilities may be equipped with sensors that can detect a vehicle parked in a given surplus parking space, identify the vehicle according to certain distinguishing characteristics (e.g., a license plate number, vehicle identification number (VIN), and/or the like), and associate the surplus parking space with coordinates indicating the precise position of the vehicle in the given surplus parking space. In some implementations, the vehicle storage platform may use any one or more of the above-mentioned methods to track vehicle locations and/or movement in substantially real-time.

As further shown in FIG. 1F, and by reference number 136, the inventory management device may report one or more changes to the inventory of vehicles to be stored in the surplus parking spaces. For example, when the inventory management device is associated with a seller of vehicles, the changes to the inventory of vehicles may indicate that one or more vehicles have been sold or leased. In some implementations, the vehicle storage platform may remove the one or more vehicles that have been sold or leased from the vehicles that users can search for via the vehicle storage platform. Furthermore, in some implementations, the vehicle storage platform may optionally collect a service charge from the vehicle dealer based on the customer purchasing or leasing the vehicle from the vehicle dealer. In other examples, the changes to the inventory of vehicles may additionally, or alternatively, include changes whereby one or more new vehicles are to be added to the inventory of vehicles. In such cases, the vehicle storage platform may locate one or more possible sites to store the new vehicles, provide a recommended storage location for the new vehicles, and/or the like, as described in further detail above.

As further shown in FIG. 1F, and by reference number 138, the parking provider device may also report one or more changes to the available parking inventory at the parking facility associated therewith. For example, the parking facility could be renovated, restructured, and/or the like to increase a total quantity of parking spaces at the parking facility, which may result in an increase in the quantity of surplus parking spaces that are available for third party use. In another example, the establishment associated with the parking facility may be expanded, which may result in a decrease in the quantity of surplus parking spaces available for third party use. In still another example, there may be short-term, long-term, and/or permanent fluctuations in parking usage patterns that result in increased and/or decreased availability of surplus parking spaces. Accordingly, the parking provider device may report these and/or other suitable changes to the available parking inventory to the vehicle storage platform, which may involve registering additional parking spaces for use by third parties, unregistering one or more parking spaces to reclaim such parking spaces from one or more third parties, and/or the like.

As further shown in FIG. 1F, and by reference number 140, the vehicle storage platform may update one or more models based on the information reported from the user devices, vehicles, inventory management devices, parking provider devices, equipment at the parking facilities, and/or the like. As noted above, these and other models may be used in conjunction with one or more artificial intelligence and/or machine learning algorithms used to determine optimal vehicle storage locations, to determine locations where vehicles can be picked up for use, to plan deliveries and/or movement of vehicles between locations, and/or the like.

As indicated above, FIGS. 1A-1F are provided merely as one or more examples. Other examples may differ from what is described with regard to FIGS. 1A-1F.

Figure 2:
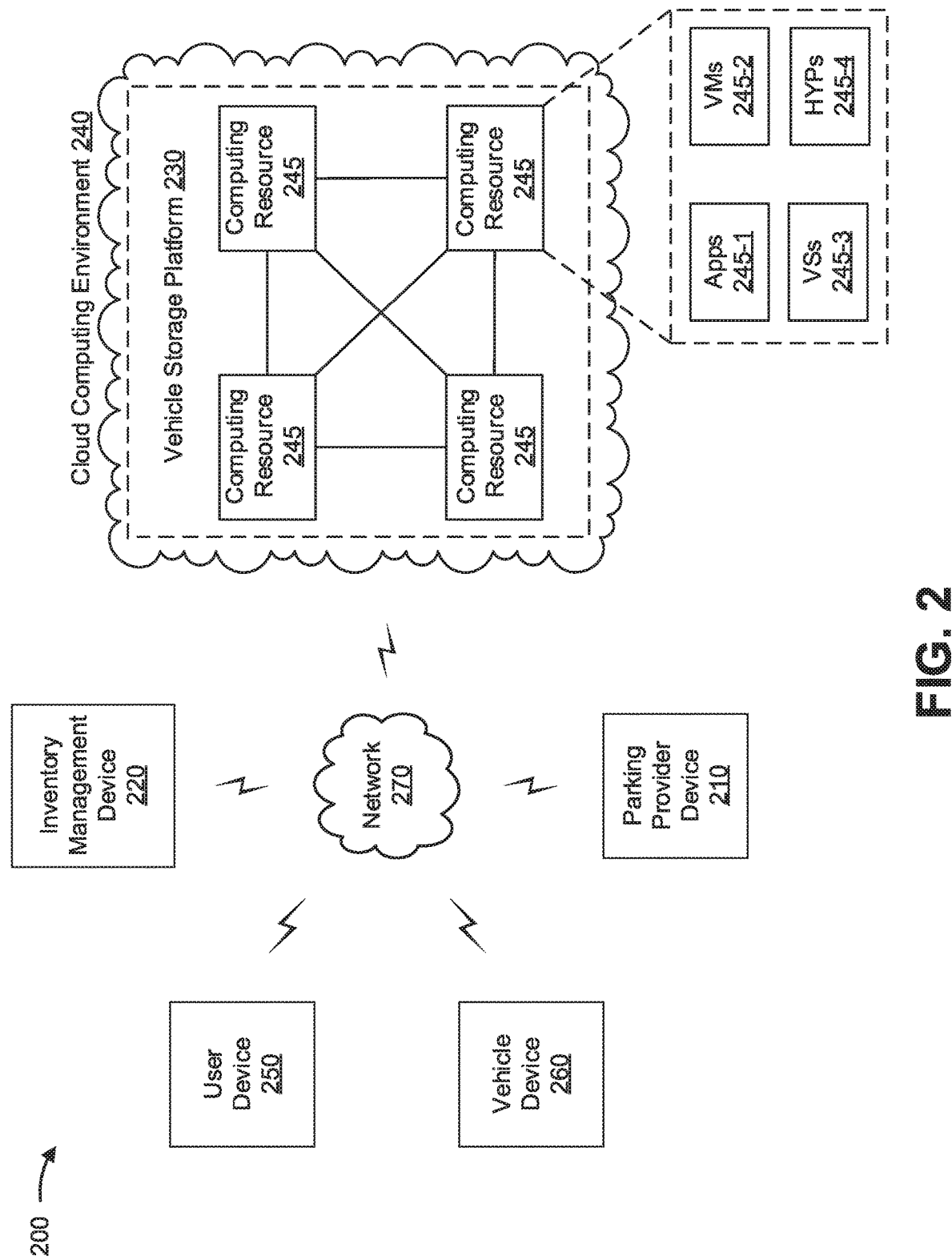
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a parking provider device 210, an inventory management device 220, a vehicle storage platform 230, a cloud computing environment 240, a computing resource 245, a user device 250, a vehicle device 260, and a network 270. Devices of environment 200 may interconnect via wired connections, wireless connections, or a combination of wired and wireless connections.

Parking provider device 210 includes one or more devices capable of receiving, generating, storing, processing, and/or providing information associated with operating a parking facility. For example, parking provider device 210 may include a computer (e.g., a desktop computer, a laptop computer, a tablet computer, a handheld computer, a server device, etc.), a mobile phone (e.g., a smart phone, a radiotelephone, etc.), an Internet of Things (IoT) device, and/or the like. In some implementations, parking provider device 210 may be associated with a first organization that owns, rents, and/or otherwise operates a parking facility, and may identify a set of surplus parking spaces to be made available for use by one or more third parties. For example, parking provider device 210 may interact with sensors or other devices of a parking facility to identify surplus parking spaces. In some implementations, parking provider device 210 may register surplus spaces with vehicle storage platform 230.

Inventory management device 220 includes one or more devices capable of receiving, generating, storing, processing, and/or providing information associated with managing an inventory of vehicles. For example, inventory management device 220 may include a computer (e.g., a desktop computer, a laptop computer, a tablet computer, a handheld computer, a server device, etc.), a mobile phone (e.g., a smart phone, a radiotelephone, etc.), an IoT device, and/or the like. In some implementations, inventory management device 220 may be associated with a second organization that has an inventory of vehicles to be stored while the vehicles are not in use (e.g., vehicles that are available to purchase, lease, or rent from the second organization, fleet vehicles that are available for use by employees, agents, and/or other users authorized by the second organization, and/or the like). In some implementations, the second organization associated with inventory management device 220 may enter into one or more transactions with the first organization associated with parking provider device 210 to rent, purchase, or otherwise obtain rights to use on or more of the surplus parking spaces that parking provider device 210 registered with vehicle storage platform 230.

Vehicle storage platform 230 includes one or more computing resources assigned to provide lotless storage of vehicle inventory. For example, vehicle storage platform 230 may be a platform implemented by cloud computing environment 240 that may leverage existing unutilized and/or underutilized parking infrastructure to store vehicles in an inventory of vehicles associated with one or more organizations. In some implementations, vehicle storage platform 230 is implemented by computing resources 245 of cloud computing environment 240.

Vehicle storage platform 230 may include a server device or a group of server devices. In some implementations, vehicle storage platform 230 may be hosted in cloud computing environment 240. Notably, while implementations described herein describe vehicle storage platform 230 as being hosted in cloud computing environment 240, in some implementations, vehicle storage platform 230 may be non-cloud-based or may be partially cloud-based.

Cloud computing environment 240 includes an environment that delivers computing as a service, whereby shared resources, services, etc. may be provided to parking provider device 210, inventory management device 220, user device 250, vehicle device 260, and/or the like. Cloud computing environment 240 may provide computation, software, data access, storage, and/or other services that do not require end-user knowledge of a physical location and configuration of a system and/or a device that delivers the services. As shown, cloud computing environment 240 may include vehicle storage platform 230 and computing resource 245.

Computing resource 245 includes one or more personal computers, workstation computers, server devices, or another type of computation and/or communication device. In some implementations, computing resource 245 may host vehicle storage platform 230. The cloud resources may include compute instances executing in computing resource 245, storage devices provided in computing resource 245, data transfer devices provided by computing resource 245, etc. In some implementations, computing resource 245 may communicate with other computing resources 245 via wired connections, wireless connections, or a combination of wired and wireless connections.

As further shown in FIG. 2, computing resource 245 may include a group of cloud resources, such as one or more applications ("APPs") 245-1, one or more virtual machines ("VMs") 245-2, virtualized storage ("VSs") 245-3, one or more hypervisors ("HYPs") 245-4, and/or the like.

Application 245-1 includes one or more software applications that may be provided to or accessed by user device 250. Application 245-1 may eliminate a need to install and execute the software applications on user device 250. For example, application 245-1 may include software associated with vehicle storage platform 230 and/or any other software capable of being provided via cloud computing environment 240. In some implementations, one application 245-1 may send/receive information to/from one or more other applications 245-1, via virtual machine 245-2.

Virtual machine 245-2 includes a software implementation of a machine (e.g., a computer) that executes programs like a physical machine. Virtual machine 245-2 may be either a system virtual machine or a process virtual machine, depending upon use and degree of correspondence to any real machine by virtual machine 245-2. A system virtual machine may provide a complete system platform that supports execution of a complete operating system ("OS"). A process virtual machine may execute a single program, and may support a single process. In some implementations, virtual machine 245-2 may execute on behalf of a user (e.g., user device 250), and may manage infrastructure of cloud computing environment 240, such as data management, synchronization, or long-duration data transfers.

Virtualized storage 245-3 includes one or more storage systems and/or one or more devices that use virtualization techniques within the storage systems or devices of computing resource 245. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 245-4 provides hardware virtualization techniques that allow multiple operating systems (e.g., "guest operating systems") to execute concurrently on a host computer, such as computing resource 245. Hypervisor 245-4 may present a virtual operating platform to the guest operating systems, and may manage the execution of the guest operating systems. Multiple instances of a variety of operating systems may share virtualized hardware resources.

User device 250 includes one or more devices capable of receiving, generating, storing, processing, and/or providing information associated with one or more users that may request to use one or more vehicles in an inventory of vehicles, one or more users that may agree to transport a vehicle in an inventory of vehicles from a storage location to a starting location for a requested use of the vehicle, and/or the like. For example, in some implementations, user device 250 may include a communication and/or computing device, such as a mobile phone (e.g., a smart phone, a radiotelephone, etc.), a laptop computer, a tablet computer, a handheld computer, a gaming device, a wearable communication device (e.g., a smart wristwatch, a pair of smart eyeglasses, etc.), or a similar type of device.

Vehicle device 260 includes one or more devices capable of receiving, generating, storing, processing, and/or providing information, such as information described herein. In some implementations, vehicle device 260 may include a device integrated within a vehicle, such as an in-vehicle infotainment (IVI) system, an in-car entertainment (ICE) system, a telematics device, a Global Positioning System (GPS) device, or a similar type of device. In some implementations, vehicle device 260 may include a device that is separate from but associated with a vehicle, such as a mobile phone (e.g., a smart phone, a radiotelephone, etc.), a laptop computer, a tablet computer, a desktop computer, a handheld computer, a gaming device, a wearable communication device (e.g., a smart wristwatch, a pair of smart eyeglasses, etc.), or a similar type of device. In some implementations, vehicle device 260 may receive information from and/or transmit information to vehicle storage platform 230, as described herein.

Network 270 includes one or more wired and/or wireless networks. For example, network 270 may include a cellular network (e.g., a long-term evolution (LTE) network, a code division multiple access (CDMA) network, a 3G network, a 4G network, a 5G network, another type of next generation network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as one or more examples. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
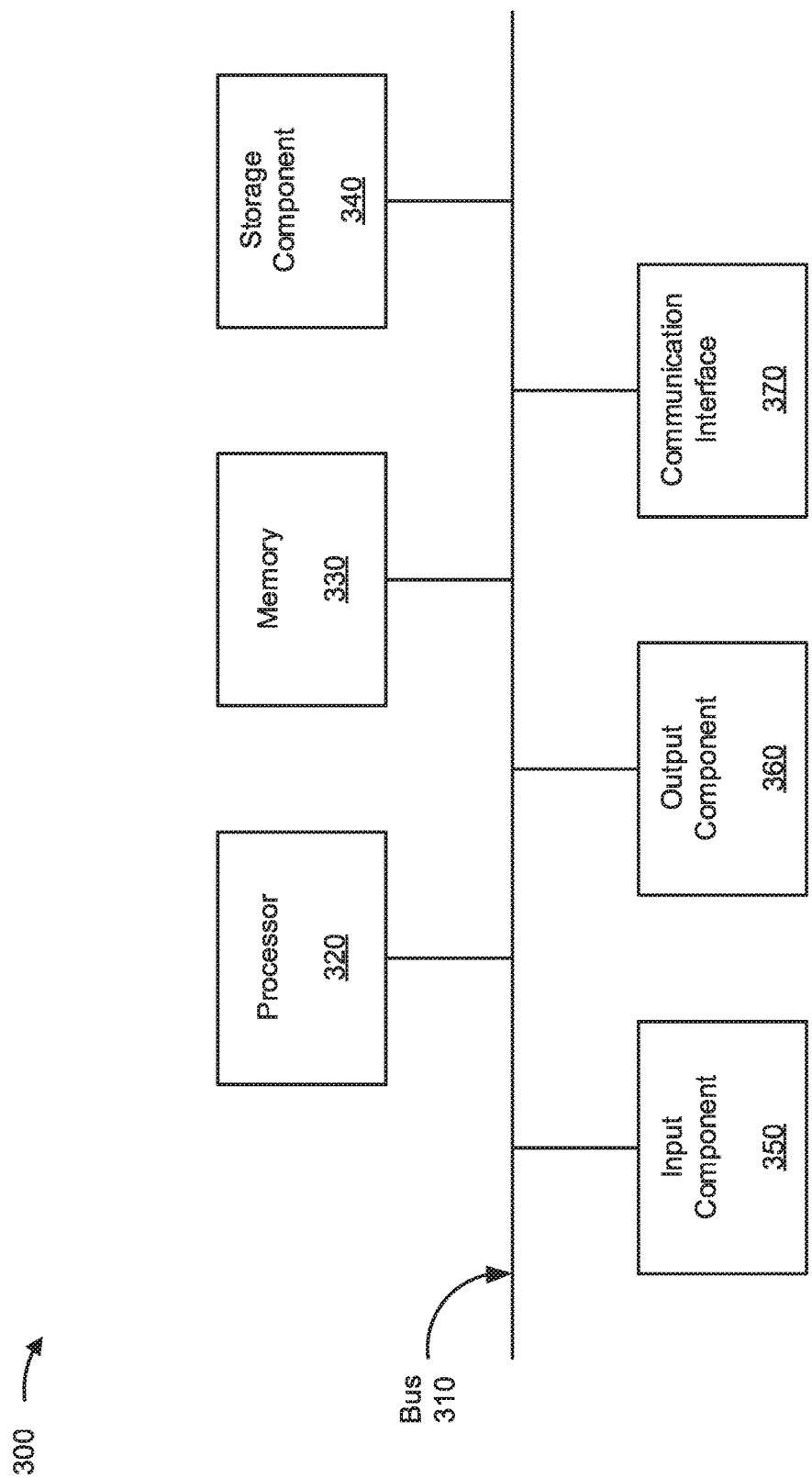
FIG. 3 is a diagram of example components of one or more devices of FIG. 2.

FIG. 3 is a diagram of example components of a device 300. Device 300 may correspond to parking provider device 210, inventory management device 220, vehicle storage platform 230, computing resource 234, user device 250, and/or vehicle device 260. In some implementations, parking provider device 210, inventory management device 220, vehicle storage platform 230, computing resource 234, user device 250, and/or vehicle device 260 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among multiple components of device 300. Processor 320 is implemented in hardware, firmware, and/or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random-access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, and/or a magneto-optic disk), a solid-state drive (SSD), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a component for determining location (e.g., a global positioning system (GPS) component) and/or a sensor (e.g., an accelerometer, a gyroscope, an actuator, another type of positional or environmental sensor, and/or the like). Output component 360 includes a component that provides output information from device 300 (via, e.g., a display, a speaker, a haptic feedback component, an audio or visual indicator, and/or the like).

Communication interface 370 includes a transceiver-like component (e.g., a transceiver, a separate receiver, a separate transmitter, and/or the like) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, and/or the like.

Device 300 may perform one or more processes described herein. Device 300 may perform these processes based on processor 320 executing software instructions stored by a non-transitory computer-readable medium, such as memory 330 and/or storage component 340. As used herein, the term "computer-readable medium" refers to a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardware circuitry may be used in place of or in combination with software instructions to perform one or more processes described herein. Thus, implementations described herein are not limited to any specific combination of hardware circuitry and software.

The number and arrangement of components shown in FIG. 3 are provided as one or more examples. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
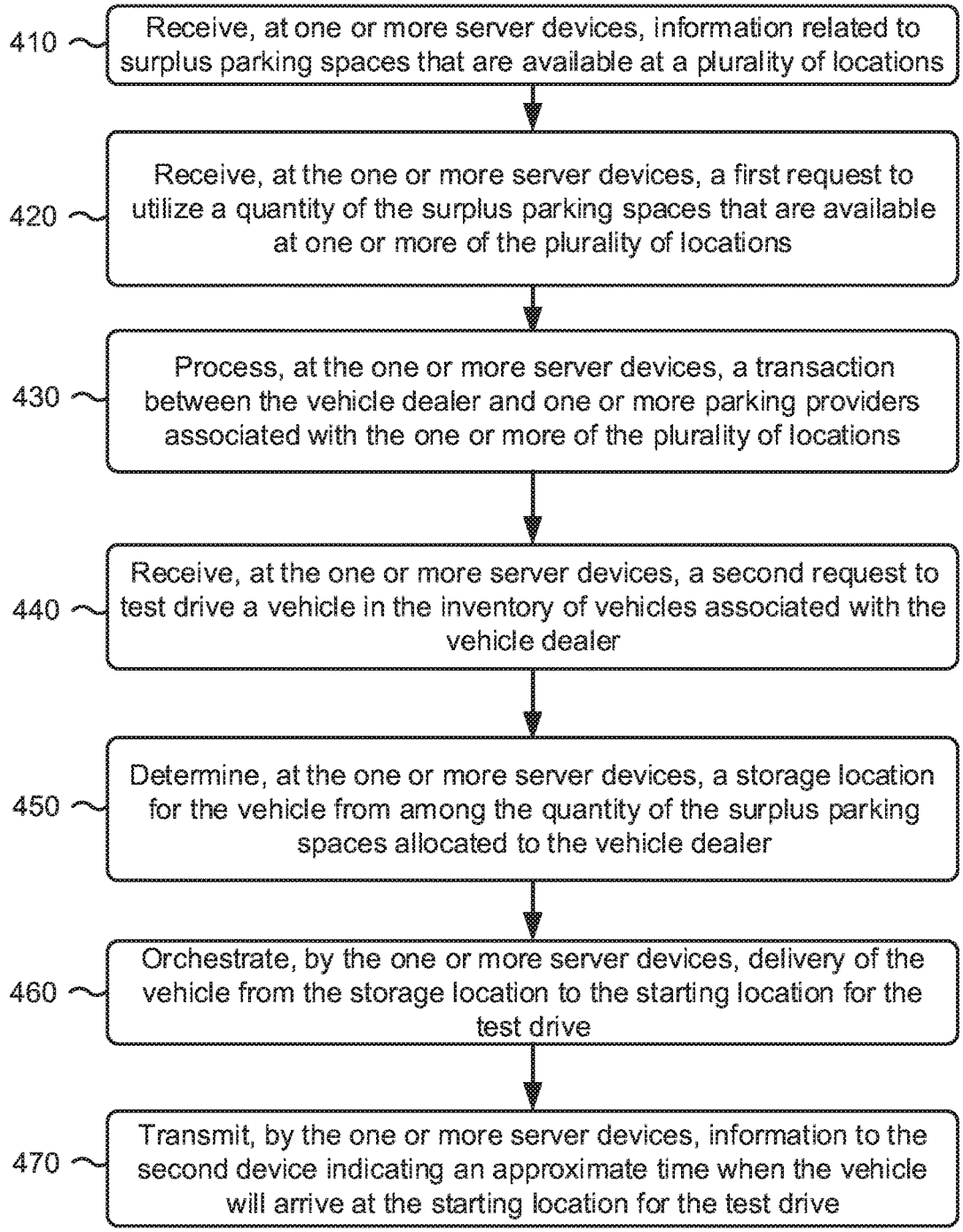
FIGS. 4-6 are flow charts of example processes for managing vehicle inventory.

FIG. 4 is a flow chart of an example process 400 for managing vehicle inventory. In some implementations, one or more process blocks of FIG. 4 may be performed by one or more server devices (e.g., vehicle storage platform 230). In some implementations, one or more process blocks of FIG. 4 may be performed by another device or a group of devices separate from or including the one or more server devices, such as a parking provider device (e.g., parking provider device 210), an inventory management device (e.g., inventory management device 220), a computing resource (e.g., computing resource 234), a user device (e.g., user device 250), a vehicle device (e.g., vehicle device 260), and/or the like.

As shown in FIG. 4, process 400 may include receiving information related to surplus parking spaces that are available at a plurality of locations (block 410). For example, the one or more server devices (e.g., using computing resource 245, processor 320, memory 330, storage component 340, input component 350, communication interface 370, and/or the like) may receive information related to surplus parking spaces that are available at a plurality of locations, as described above.

As further shown in FIG. 4, process 400 may include receiving a first request to utilize a quantity of the surplus parking spaces that are available at one or more of the plurality of locations (block 420). For example, the one or more server devices (e.g., using computing resource 245, processor 320, memory 330, storage component 340, input component 350, communication interface 370, and/or the like) may receive a first request to utilize a quantity of the surplus parking spaces that are available at one or more of the plurality of locations, as described above. In some implementations, the first request may be received from a first device associated with a vehicle dealer having an inventory of vehicles to be stored in the surplus parking spaces that are available at the one or more of the plurality of locations.

As further shown in FIG. 4, process 400 may include processing a transaction between the vehicle dealer and one or more parking providers associated with the one or more of the plurality of locations (block 430). For example, the one or more server devices (e.g., using computing resource 245, processor 320, memory 330, storage component 340, input component 350, communication interface 370, and/or the like) may process a transaction between the vehicle dealer and one or more parking providers associated with the one or more of the plurality of locations, as described above. In some implementations, the transaction may allocate the quantity of the surplus parking spaces available at the one or more of the plurality of locations to the vehicle dealer.

As further shown in FIG. 4, process 400 may include receiving a second request to test drive a vehicle in the inventory of vehicles associated with the vehicle dealer (block 440). For example, the one or more server devices (e.g., using computing resource 245, processor 320, memory 330, storage component 340, input component 350, communication interface 370, and/or the like) may receive a second request to test drive a vehicle in the inventory of vehicles associated with the vehicle dealer, as described above. In some implementations, the second request may be received from a second device associated with a customer and identifies a starting location for the test drive.

As further shown in FIG. 4, process 400 may include determining a storage location for the vehicle from among the quantity of the surplus parking spaces allocated to the vehicle dealer (block 450). For example, the one or more server devices (e.g., using computing resource 245, processor 320, memory 330, storage component 340, input component 350, communication interface 370, and/or the like) may determine a storage location for the vehicle from among the quantity of the surplus parking spaces allocated to the vehicle dealer, as described above. In some implementations, the storage location for the vehicle may differ from the starting location for the test drive.

As further shown in FIG. 4, process 400 may include orchestrating delivery of the vehicle from the storage location to the starting location for the test drive (block 460). For example, the one or more server devices (e.g., using computing resource 245, processor 320, memory 330, storage component 340, input component 350, communication interface 370, and/or the like) may orchestrate delivery of the vehicle from the storage location to the starting location for the test drive, as described above.

As further shown in FIG. 4, process 400 may include transmitting information to the second device indicating an approximate time when the vehicle will arrive at the starting location for the test drive (block 470). For example, the one or more server devices (e.g., using computing resource 245, processor 320, memory 330, storage component 340, input component 350, communication interface 370, and/or the like) may transmit information to the second device indicating an approximate time when the vehicle will arrive at the starting location for the test drive, as described above.

Process 400 may include additional implementations, such as any single implementation or any combination of implementations described below and/or in connection with one or more other processes described elsewhere herein.

In some implementations, when orchestrating the delivery of the vehicle from the storage location to the starting location for the test drive, the one or more server devices may advertise, via a crowd-sourcing interface, an offer to utilize the vehicle, where the offer includes a cost to utilize the vehicle until a specified time and indicates a requirement to leave the vehicle at the starting location for the test drive at or before the specified time, may receive, via the crowd-sourcing interface, an acceptance of the offer to utilize the vehicle from a third device, and may collect, from the third device, a payment for the cost to utilize the vehicle until the specified time.

In some implementations, when orchestrating the delivery of the vehicle from the storage location to the starting location for the test drive, the one or more server devices may transmit, to the vehicle, a command that causes the vehicle to autonomously drive from the storage location to the starting location for the test drive. In some implementations, the one or more server devices may receive, from the first device associated with the vehicle dealer, information indicating that the customer purchased or leased the vehicle from the vehicle dealer, and may collect a service charge from the vehicle dealer based on the customer purchasing or leasing the vehicle from the vehicle dealer.

In some implementations, the one or more server devices may receive, from the first device associated with the vehicle dealer, a third request for a recommended storage location for a new vehicle to be added to the inventory of vehicles, where the third request includes profile information associated with a likely user of the new vehicle, and may transmit, to the first device associated with the vehicle dealer, information indicating the recommended storage location for the new vehicle, where the recommended storage location is selected based on a comparison of the profile information associated with the likely user of the new vehicle and profile information associated with clientele at one or more establishments in proximity to the quantity of the surplus parking spaces allocated to the vehicle dealer.

In some implementations, the one or more server devices may track real-time movement of the vehicle, where the information transmitted to the second device further indicates the real-time movement of the vehicle. In some implementations, the real-time movement of the vehicle may be tracked based on information received from one or more of the vehicle or a third device associated with a user moving the vehicle from the storage location to the starting location for the test drive.

In some implementations, the one or more server devices may transmit, to the second device, a notification indicating that the vehicle is ready to test drive based on the real-time movement indicating that the vehicle has arrived at the starting location for the test drive, where the notification further indicates that the customer can park the vehicle in any of the quantity of the surplus parking spaces allocated to the vehicle dealer after the customer has completed the test drive.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
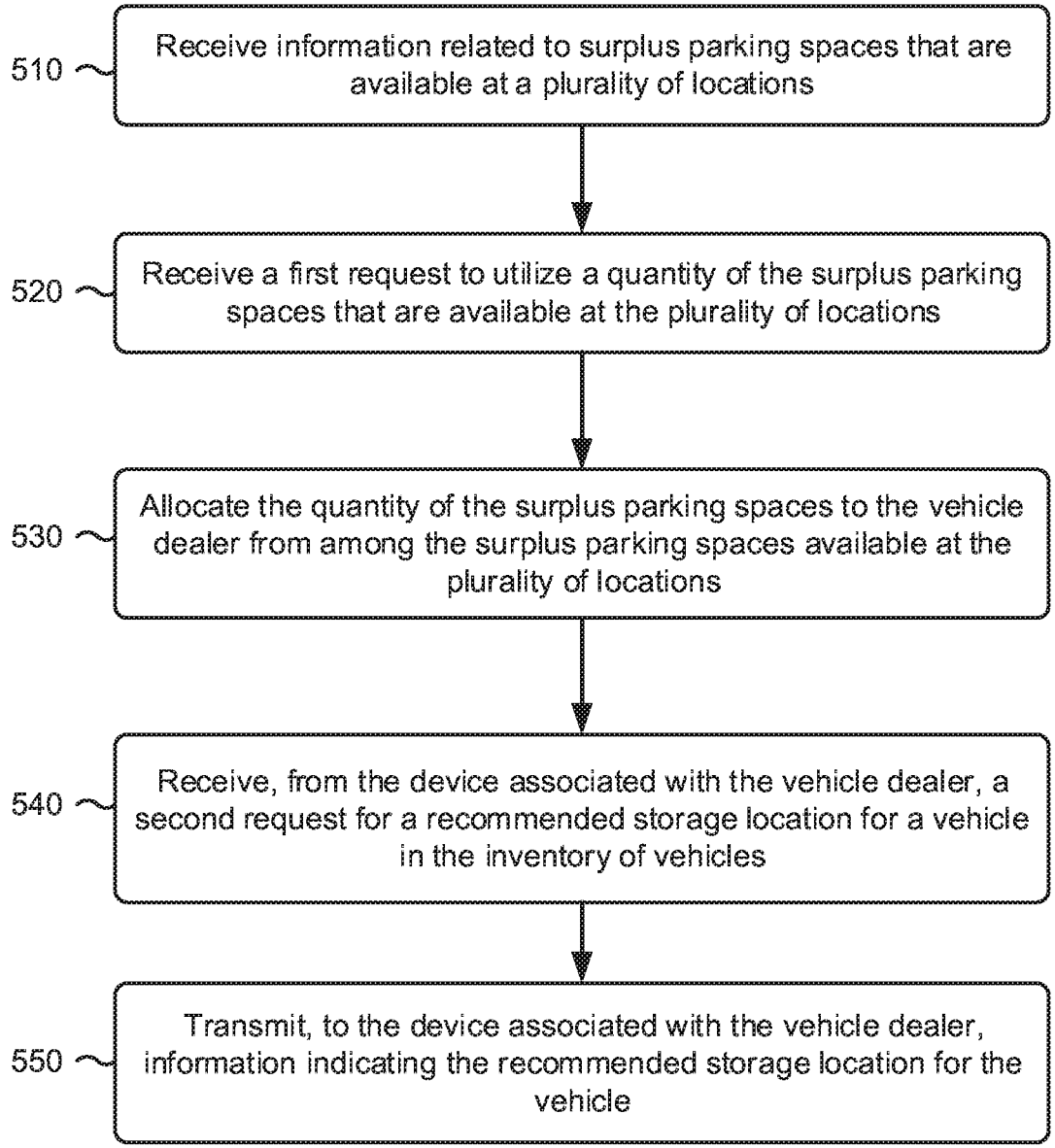

FIG. 5 is a flow chart of an example process 500 for managing vehicle inventory. In some implementations, one or more process blocks of FIG. 5 may be performed by one or more server devices (e.g., vehicle storage platform 230). In some implementations, one or more process blocks of FIG. 5 may be performed by another device or a group of devices separate from or including the one or more server devices, such as a parking provider device (e.g., parking provider device 210), an inventory management device (e.g., inventory management device 220), a computing resource (e.g., computing resource 234), a user device (e.g., user device 250), a vehicle device (e.g., vehicle device 260), and/or the like.

As shown in FIG. 5, process 500 may include receiving information related to surplus parking spaces that are available at a plurality of locations (block 510). For example, the one or more server devices (e.g., using computing resource 245, processor 320, memory 330, storage component 340, input component 350, communication interface 370, and/or the like) may receive information related to surplus parking spaces that are available at a plurality of locations, as described above.

As further shown in FIG. 5, process 500 may include receiving a first request to utilize a quantity of the surplus parking spaces that are available at the plurality of locations (block 520). For example, the one or more server devices (e.g., using computing resource 245, processor 320, memory 330, storage component 340, input component 350, communication interface 370, and/or the like) may receive a first request to utilize a quantity of the surplus parking spaces that are available at the plurality of locations, as described above. In some implementations, the first request may be received from a device associated with a vehicle dealer having an inventory of vehicles to be stored in the surplus parking spaces.

As further shown in FIG. 5, process 500 may include allocating the quantity of the surplus parking spaces to the vehicle dealer from among the surplus parking spaces available at the plurality of locations (block 530). For example, the one or more server devices (e.g., using computing resource 245, processor 320, memory 330, storage component 340, input component 350, communication interface 370, and/or the like) may allocate the quantity of the surplus parking spaces to the vehicle dealer from among the surplus parking spaces available at the plurality of locations, as described above. In some implementations, the quantity of the surplus parking spaces allocated to the vehicle dealer may include a first set of surplus parking spaces available at a first one of the plurality of locations and a second set of surplus parking spaces available at a second one of the plurality of locations.

As further shown in FIG. 5, process 500 may include receiving, from the device associated with the vehicle dealer, a second request for a recommended storage location for a vehicle in the inventory of vehicles (block 540). For example, the one or more server devices (e.g., using computing resource 245, processor 320, memory 330, storage component 340, input component 350, communication interface 370, and/or the like) may receive, from the device associated with the vehicle dealer, a second request for a recommended storage location for a vehicle in the inventory of vehicles, as described above. In some implementations, the second request may include profile information associated with a likely user of the vehicle.

As further shown in FIG. 5, process 500 may include transmitting, to the device associated with the vehicle dealer, information indicating the recommended storage location for the vehicle (block 550). For example, the one or more server devices (e.g., using computing resource 245, processor 320, memory 330, storage component 340, input component 350, communication interface 370, and/or the like) may transmit, to the device associated with the vehicle dealer, information indicating the recommended storage location for the vehicle, as described above. In some implementations, the recommended storage location may be selected from among the first one of the plurality of locations and the second one of the plurality of locations based on a comparison of the profile information associated with the likely user of the vehicle and profile information associated with clientele at establishments in proximity to the first set of surplus parking spaces and the second set of surplus parking spaces allocated to the vehicle dealer Process 500 may include additional implementations, such as any single implementation or any combination of implementations described below and/or in connection with one or more other processes described elsewhere herein.

In some implementations, the recommended storage location may be selected to minimize one or more of a frequency or a distance to move the vehicle to likely starting locations for a test drive of the vehicle. In some implementations, the first one of the plurality of locations and the second one of the plurality of locations may be associated with one or more organizations that specify one or more criteria for vehicles to be stored in the first set of surplus parking spaces and the second set of surplus parking spaces, and the first set of surplus parking spaces and the second set of surplus parking spaces may be allocated to the vehicle dealer based on a substantial match between the inventory of vehicles to be stored in the surplus parking spaces and the one or more criteria specified by the one or more organizations.

In some implementations, the one or more server devices may receive a request to test drive the vehicle from a customer, and may transmit, to the vehicle, a command enabling the customer to enter and drive the vehicle based on receiving information to authenticate the customer, where the information to authenticate the customer includes driver's license information and/or proof of insurance.

In some implementations, the one or more server devices may orchestrate delivery of the vehicle to a starting location for a test drive of the vehicle, and may provide a customer with information indicating an approximate time when the vehicle will arrive at the starting location for the test drive. In some implementations, the one or more server devices may track movement of the vehicle, and may notify the customer that the vehicle is ready for the test drive based on the movement of the vehicle indicating that the vehicle has arrived at the starting location for the test drive.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6:
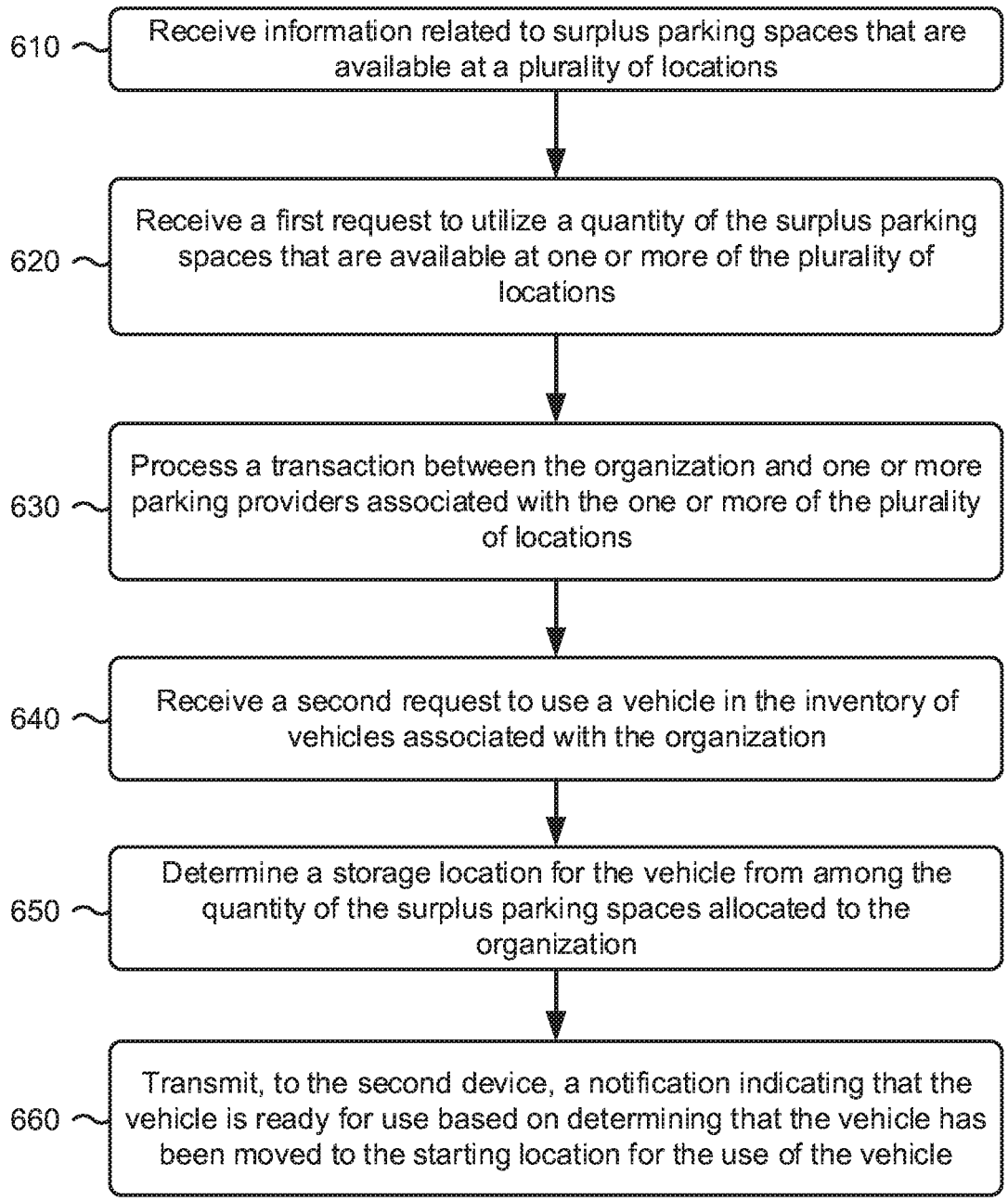

FIG. 6 is a flow chart of an example process 600 for managing vehicle inventory. In some implementations, one or more process blocks of FIG. 6 may be performed by one or more server devices (e.g., vehicle storage platform 230). In some implementations, one or more process blocks of FIG. 6 may be performed by another device or a group of devices separate from or including the one or more server devices, such as a parking provider device (e.g., parking provider device 210), an inventory management device (e.g., inventory management device 220), a computing resource (e.g., computing resource 234), a user device (e.g., user device 250), a vehicle device (e.g., vehicle device 260), and/or the like.

As shown in FIG. 6, process 600 may include receiving information related to surplus parking spaces that are available at a plurality of locations (block 610). For example, the one or more server devices (e.g., using computing resource 245, processor 320, memory 330, storage component 340, input component 350, communication interface 370, and/or the like) may receive information related to surplus parking spaces that are available at a plurality of locations, as described above.

As further shown in FIG. 6, process 600 may include receiving a first request to utilize a quantity of the surplus parking spaces that are available at one or more of the plurality of locations (block 620). For example, the one or more server devices (e.g., using computing resource 245, processor 320, memory 330, storage component 340, input component 350, communication interface 370, and/or the like) may receive a first request to utilize a quantity of the surplus parking spaces that are available at one or more of the plurality of locations, as described above. In some implementations, the first request may be received from a first device associated with an organization having an inventory of vehicles to be stored in the surplus parking spaces that are available at the one or more of the plurality of locations.

As further shown in FIG. 6, process 600 may include processing a transaction between the organization and one or more parking providers associated with the one or more of the plurality of locations (block 630). For example, the one or more server devices (e.g., using computing resource 245, processor 320, memory 330, storage component 340, input component 350, communication interface 370, and/or the like) may process a transaction between the organization and one or more parking providers associated with the one or more of the plurality of locations, as described above. In some implementations, the transaction may allocate the quantity of the surplus parking spaces available at the one or more of the plurality of locations to the organization.

As further shown in FIG. 6, process 600 may include receiving a second request to use a vehicle in the inventory of vehicles associated with the organization (block 640). For example, the one or more server devices (e.g., using computing resource 245, processor 320, memory 330, storage component 340, input component 350, communication interface 370, and/or the like) may receive a second request to use a vehicle in the inventory of vehicles associated with the organization, as described above. In some implementations, the second request may be received from a second device associated with a user and identifies a starting location for the use of the vehicle.

As further shown in FIG. 6, process 600 may include determining a storage location for the vehicle from among the quantity of the surplus parking spaces allocated to the organization (block 650). For example, the one or more server devices (e.g., using computing resource 245, processor 320, memory 330, storage component 340, input component 350, communication interface 370, and/or the like) may determine a storage location for the vehicle from among the quantity of the surplus parking spaces allocated to the organization, as described above. In some implementations, the storage location for the vehicle may differ from the starting location for the use of the vehicle.

As further shown in FIG. 6, process 600 may include transmitting, to the second device, a notification indicating that the vehicle is ready for use based on determining that the vehicle has been moved to the starting location for the use of the vehicle (block 660). For example, the one or more server devices (e.g., using computing resource 245, processor 320, memory 330, storage component 340, input component 350, communication interface 370, and/or the like) may transmit, to the second device, a notification indicating that the vehicle is ready for use based on determining that the vehicle has been moved to the starting location for the use of the vehicle, as described above.

Process 600 may include additional implementations, such as any single implementation or any combination of implementations described below and/or in connection with one or more other processes described elsewhere herein.

In some implementations, the one or more server devices may transmit, to the vehicle, a command that causes the vehicle to autonomously drive from the storage location to the starting location for the use of the vehicle. In some implementations, the user may be a first user, and the one or more server devices may transmit, to a third device associated with a second user, an offer to pay the second user a first amount to move the vehicle from the storage location to the starting location for the use of the vehicle, may credit the first amount to a first account associated with the second user based on determining that the second user has moved the vehicle to the starting location for the use of the vehicle, and may charge a second amount to a second account associated with the organization for orchestrating delivery of the vehicle to the starting location for the use of the vehicle.

In some implementations, the one or more server devices may provide, to the second device, information indicating one or more locations where the user is permitted to leave the vehicle when the use of the vehicle is complete. In some implementations, the one or more server devices may track a real-time location for each vehicle in the inventory of vehicles, where the real-time location for a particular vehicle, in the inventory of vehicles, indicates a specific one of the quantity of the surplus parking spaces in which the particular vehicle is parked.

In some implementations, the second request may identify the vehicle according to one or more parameters, and the vehicle may be moved to the starting location for the use of the vehicle is one of a plurality of vehicles in the inventory of vehicles that corresponds to the one or more parameters identified in the second request and is located closest to the starting location for the use of the vehicle.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description, but is not intended to be exhaustive or to limit the implementations to the precise forms disclosed. Modifications and variations may be made in light of the above disclosure or may be acquired from practice of the implementations.

As used herein, the term "component" is intended to be broadly construed as hardware, firmware, and/or a combination of hardware and software.

It will be apparent that systems and/or methods described herein may be implemented in different forms of hardware, firmware, or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
   receiving, by a first device, information related to surplus parking spaces that are available at a plurality of locations,
      each of the plurality of locations being associated with one or more usage criteria for the surplus parking spaces;
   receiving, by the first device, a first request to utilize a quantity of the surplus parking spaces that are available at the plurality of locations, wherein the first request is received from a second device associated with a vehicle dealer having an inventory of vehicles to be stored in the surplus parking spaces;

allocating, by the first device, the quantity of the surplus parking spaces to the vehicle dealer from among the surplus parking spaces available at the plurality of locations,
  wherein the quantity of the surplus parking spaces allocated to the vehicle dealer includes a first set of surplus parking spaces available at a first one of the plurality of locations and a second set of surplus parking spaces available at a second one of the plurality of locations;

receiving, by the first device and from the second device, a second request for a recommended storage location for a vehicle in the inventory of vehicles,
  wherein the second request includes one or more parameters associated with the vehicle, the one or more parameters including one or more of:
    one or more vehicle parameters associated with a type of the vehicle,
    one or more usage terms for the surplus parking spaces,
    data identifying a quantity of parking spaces,
    data identifying a preferred location for storage, or
    profile information associated with the vehicle;

determining, by the first device, at least one first score for the first one of the plurality of locations and at least one second score for the second one of the plurality of locations,
  the first score being determined based on a comparison of the one or more parameters and first usage criteria, of the one or more usage criteria, associated with the first one of the plurality of locations, and
  the second score being determined based on a comparison of the one or more parameters and second usage criteria, of the one or more usage criteria, associated with the second one of the plurality of locations;

selecting, by the first device and based on the at least one first score and the at least one second score, the recommended storage location for the vehicle from among the first one of the plurality of locations and the second one of the plurality of locations; and transmitting, by the first device and to the second device, information indicating the recommended storage location for the vehicle.

2. The method of claim 1, wherein the recommended storage location is further selected to minimize one or more of a frequency or a distance to move the vehicle to likely starting locations for a test drive of the vehicle.

3. The method of claim 1, wherein the first one of the plurality of locations and the second one of the plurality of locations are associated with one or more organizations that specify the one or more usage criteria, and
  wherein the first set of surplus parking spaces and the second set of surplus parking spaces are allocated to the vehicle dealer based on a substantial match between the inventory of vehicles to be stored in the surplus parking spaces and the one or more usage criteria.

4. The method of claim 1, further comprising:
receiving a request to test drive the vehicle from a customer; and
transmitting, to the vehicle, a command enabling the customer to enter and drive the vehicle based on receiving information to authenticate the customer, wherein the information to authenticate the customer comprises one or more of driver's license information or proof of insurance.

5. The method of claim 1, further comprising:
orchestrating delivery of the vehicle to a starting location for a test drive of the vehicle; and
providing a customer with information indicating an approximate time when the vehicle will arrive at the starting location for the test drive.

6. The method of claim 5, further comprising:
tracking movement of the vehicle; and
notifying the customer that the vehicle is ready for the test drive based on the movement of the vehicle indicating that the vehicle has arrived at the starting location for the test drive.

7. The method of claim 1, further comprising:
transmitting, to the vehicle, a command that causes the vehicle to autonomously drive to the recommended storage location.

8. A first device, comprising:
one or more memories; and
one or more processors communicatively coupled to the one or more memories, configured to:
  receive information related to surplus parking spaces that are available at a plurality of locations,
    each of the plurality of locations being associated with one or more usage criteria for the surplus parking spaces;
  receive a first request to utilize a quantity of the surplus parking spaces that are available at the plurality of locations,
    wherein the first request is received from a second device associated with a vehicle dealer having an inventory of vehicles to be stored in the surplus parking spaces;
  allocate the quantity of the surplus parking spaces to the vehicle dealer from among the surplus parking spaces available at the plurality of locations,
    wherein the quantity of the surplus parking spaces allocated to the vehicle dealer includes a first set of surplus parking spaces available at a first one of the plurality of locations and a second set of surplus parking spaces available at a second one of the plurality of locations;
  receive, from the second device, a second request for a recommended storage location for a vehicle in the inventory of vehicles,
    wherein the second request includes one or more parameters associated with the vehicle, the one or more parameters including one or more of:
      one or more vehicle parameters associated with a type of the vehicle,
      one or more usage terms for the surplus parking spaces,
      data identifying a quantity of parking spaces,
      data identifying a preferred location for storage, or
      profile information associated with the vehicle;
  determine at least one first score for the first one of the plurality of locations and at least one second score for the second one of the plurality of locations,
    the first score being determined based on a comparison of the one or more parameters and first usage criteria, of the one or more usage criteria, associated with the first one of the plurality of locations, and
    the second score being determined based on a comparison of the one or more parameters and second usage criteria, of the one or more usage criteria, associated with the second one of the plurality of locations;

select, based on the at least one first score and the at least one second score, the recommended storage location for the vehicle from among the first one of the plurality of locations and the second one of the plurality of locations; and transmit, to the second device, information indicating the recommended storage location for the vehicle.

9. The first device of claim 8, wherein the recommended storage location is further selected to minimize one or more of a frequency or a distance to move the vehicle to likely starting locations for a test drive of the vehicle.

10. The first device of claim 8, wherein the first one of the plurality of locations and the second one of the plurality of locations are associated with one or more organizations that specify the one or more usage criteria, and wherein the first set of surplus parking spaces and the second set of surplus parking spaces are allocated to the vehicle dealer based on a substantial match between the inventory of vehicles to be stored in the surplus parking spaces and the one or more usage criteria.

11. The first device of claim 8, wherein the one or more processors are further configured to:

receive a request to test drive the vehicle from a customer; and transmit, to the vehicle, a command enabling the customer to enter and drive the vehicle based on receiving information to authenticate the customer, wherein the one or more processors, when the information to authenticate the customer, are configured to one or more of driver's license information or proof of insurance.

12. The first device of claim 8, wherein the one or more processors are further configured to:

orchestrate delivery of the vehicle to a starting location for a test drive of the vehicle; and provide a customer with information indicating an approximate time when the vehicle will arrive at the starting location for the test drive.

13. The first device of claim 12, wherein the one or more processors are further configured to:

track movement of the vehicle; and notify the customer that the vehicle is ready for the test drive based on the movement of the vehicle indicating that the vehicle has arrived at the starting location for the test drive.

14. The first device of claim 8, wherein the one or more processors are further configured to:

transmit, to the vehicle, a command that causes the vehicle to autonomously drive to the recommended storage location.

15. A non-transitory computer-readable medium storing instructions, the instructions comprising:

one or more instructions that, when executed by one or more processors of a first device, cause the one or more processors to:

receive information related to surplus parking spaces that are available at a plurality of locations, each of the plurality of locations being associated with one or more usage criteria for the surplus parking spaces;

receive a first request to utilize a quantity of the surplus parking spaces that are available at the plurality of locations, wherein the first request is received from a second device associated with a vehicle dealer having an inventory of vehicles to be stored in the surplus parking spaces;

allocate the quantity of the surplus parking spaces to the vehicle dealer from among the surplus parking spaces available at the plurality of locations, wherein the quantity of the surplus parking spaces allocated to the vehicle dealer includes a first set of surplus parking spaces available at a first one of the plurality of locations and a second set of surplus parking spaces available at a second one of the plurality of locations;

receive, from the second device, a second request for a recommended storage location for a vehicle in the inventory of vehicles, wherein the second request includes one or more parameters associated with the vehicle, the one or more parameters including one or more of:

one or more vehicle parameters associated with a type of the vehicle, one or more usage terms for the surplus parking spaces, data identifying a quantity of parking spaces, data identifying a preferred location for storage, or profile information associated with the vehicle;

determine at least one first score for the first one of the plurality of locations and at least one second score for the second one of the plurality of locations, the first score being determined based on a comparison of the one or more parameters and first usage criteria, of the one or more usage criteria, associated with the first one of the plurality of locations, and the second score being determined based on a comparison of the one or more parameters and second usage criteria, of the one or more usage criteria, associated with the second one of the plurality of locations;

select, based on the at least one first score and the at least one second score, the recommended storage location for the vehicle from among the first one of the plurality of locations and the second one of the plurality of locations; and transmit, to the second device, information indicating the recommended storage location for the vehicle.

16. The non-transitory computer-readable medium of claim 15, wherein the recommended storage location is further selected to minimize one or more of a frequency or a distance to move the vehicle to likely starting locations for a test drive of the vehicle.

17. The non-transitory computer-readable medium of claim 15, wherein the first one of the plurality of locations and the second one of the plurality of locations are associated with one or more organizations that specify the one or more usage criteria, and wherein the first set of surplus parking spaces and the second set of surplus parking spaces are allocated to the vehicle dealer based on a substantial match between the inventory of vehicles to be stored in the surplus parking spaces and the one or more usage criteria.

18. The non-transitory computer-readable medium of claim 15, wherein the one or more instructions, when executed by the one or more processors, further cause the one or more processors to:

receive a request to test drive the vehicle from a customer; and transmit, to the vehicle, a command enabling the customer to enter and drive the vehicle based on receiving information to authenticate the customer,
  wherein the one or more instructions, that cause the one or more processors to the information to authenticate the customer, cause the one or more processors to one or more of driver's license information or proof of insurance.

19. The non-transitory computer-readable medium of claim 15, wherein the one or more instructions, when executed by the one or more processors, further cause the one or more processors to:
  orchestrate delivery of the vehicle to a starting location for a test drive of the vehicle; and
  provide a customer with information indicating an approximate time when the vehicle will arrive at the starting location for the test drive.

20. The non-transitory computer-readable medium of claim 19, wherein the one or more instructions, when executed by the one or more processors, further cause the one or more processors to:
  track movement of the vehicle; and
  notify the customer that the vehicle is ready for the test drive based on the movement of the vehicle indicating that the vehicle has arrived at the starting location for the test drive.

* * * * *